(12) United States Patent
Anderson et al.

(10) Patent No.: US 8,731,973 B2
(45) Date of Patent: May 20, 2014

(54) OVERLAYING IMAGES IN AUTOMATED INSURANCE POLICY FORM GENERATION

(75) Inventors: David Martin Anderson, Seattle, WA (US); Yi Zhang, Bothell, WA (US)

(73) Assignee: Vertafore, Inc., Bothell, WA (US)

( * ) Notice: Subject to any disclaimer, the term of this patent is extended or adjusted under 35 U.S.C. 154(b) by 84 days.

(21) Appl. No.: 13/089,886

(22) Filed: Apr. 19, 2011

(65) Prior Publication Data

US 2012/0271657 A1 Oct. 25, 2012

(51) Int. Cl.
*G06Q 40/00* (2012.01)

(52) U.S. Cl.
USPC ............... 705/4; 345/629; 345/634; 345/641

(58) Field of Classification Search
USPC .............................. 705/4; 345/629, 634, 641
See application file for complete search history.

(56) References Cited

U.S. PATENT DOCUMENTS

| | | |
|---|---|---|
| 3,970,992 A | 7/1976 | Boothroyd et al. |
| 4,346,442 A | 8/1982 | Musmanno |
| 4,347,568 A | 8/1982 | Giguere et al. |
| 4,359,631 A | 11/1982 | Lockwood et al. |
| 4,383,298 A | 5/1983 | Huff et al. |
| 4,410,940 A | 10/1983 | Carlson et al. |
| 4,429,360 A | 1/1984 | Hoffman et al. |
| 4,486,831 A | 12/1984 | Wheatley et al. |
| 4,491,725 A | 1/1985 | Pritchard |
| 4,503,499 A | 3/1985 | Mason et al. |
| 4,553,206 A | 11/1985 | Smutek et al. |
| 4,567,359 A | 1/1986 | Lockwood |

(Continued)

FOREIGN PATENT DOCUMENTS

| | | |
|---|---|---|
| CA | 2646167 A1 | 10/2007 |
| CA | 2649441 A1 | 10/2007 |

(Continued)

OTHER PUBLICATIONS

Gray, K. E. (2006). Towards customizable pedagogic programming languages. (Order No. 3224978, The University of Utah). ProQuest Dissertations and Theses, , 144-144 p. Retrieved from http://search.proquest.com/docview/304985817?accountid=14753. (304985817).*

(Continued)

*Primary Examiner* — Muriel Tinkler
(74) *Attorney, Agent, or Firm* — Seed IP Law Group PLLC

(57) ABSTRACT

Overlaying images in automated insurance policy form generation includes electronically converting a first form in a first format to a second format to and in response to receiving a Web page request, electronically communicating the second form to be displayed within the Web browser instead of electronically communicating the first form in the first format to be displayed within the Web browser. In the case where the first format is Adobe® portable document format (PDF) and the second format is Joint Picture Expert Group (JPEG) format, this enables the user of the browser to overlay images on the forms within the Web page interface of the browser, while it appears to the user they are overlaying images on the original PDF versions of the forms. The final integrated PDF form is then generated from the data indicating the location of the overlay image on the underlying JPEG form. This process may also apply to insurance policy forms wherein the overlay image is a state specific stamp to be placed on the underlying form.

22 Claims, 14 Drawing Sheets

(56) References Cited

U.S. PATENT DOCUMENTS

| | | | |
|---|---|---|---|
| 4,591,974 A | 5/1986 | Dornbush et al. |
| 4,598,367 A | 7/1986 | DeFrancesco et al. |
| 4,633,430 A | 12/1986 | Cooper |
| 4,642,768 A | 2/1987 | Roberts |
| 4,646,229 A | 2/1987 | Boyle |
| 4,646,231 A | 2/1987 | Green et al. |
| 4,646,250 A | 2/1987 | Childress |
| 4,648,037 A | 3/1987 | Valentino |
| 4,658,351 A | 4/1987 | Teng |
| 4,730,252 A | 3/1988 | Bradshaw |
| 4,794,515 A | 12/1988 | Hornung |
| 4,809,170 A | 2/1989 | Leblang et al. |
| 4,819,156 A | 4/1989 | DeLorme et al. |
| 4,831,526 A | 5/1989 | Luchs et al. |
| 4,845,644 A | 7/1989 | Anthias et al. |
| 4,860,247 A | 8/1989 | Uchida et al. |
| 4,912,628 A | 3/1990 | Briggs |
| 4,918,588 A | 4/1990 | Barrett et al. |
| 4,928,243 A | 5/1990 | Hodges et al. |
| 4,928,252 A | 5/1990 | Gabbe et al. |
| 4,949,251 A | 8/1990 | Griffin et al. |
| 4,951,194 A | 8/1990 | Bradley et al. |
| 4,959,769 A | 9/1990 | Cooper et al. |
| 4,985,831 A | 1/1991 | Dulong et al. |
| 5,072,412 A | 12/1991 | Henderson, Jr. et al. |
| 5,086,502 A | 2/1992 | Malcolm |
| 5,159,669 A | 10/1992 | Trigg et al. |
| 5,161,226 A | 11/1992 | Wainer |
| 5,170,480 A | 12/1992 | Mohan et al. |
| 5,175,853 A | 12/1992 | Kardach et al. |
| 5,201,033 A | 4/1993 | Eagen et al. |
| 5,220,665 A | 6/1993 | Coyle, Jr. et al. |
| 5,241,677 A | 8/1993 | Naganuma et al. |
| 5,257,375 A | 10/1993 | Clark et al. |
| 5,261,099 A | 11/1993 | Bigo et al. |
| 5,263,134 A | 11/1993 | Paal et al. |
| 5,265,159 A | 11/1993 | Kung |
| 5,282,052 A | 1/1994 | Johnson et al. |
| 5,317,733 A | 5/1994 | Murdock |
| 5,363,214 A | 11/1994 | Johnson |
| 5,448,729 A | 9/1995 | Murdock |
| 5,517,644 A | 5/1996 | Murdock |
| 5,530,861 A | 6/1996 | Diamant et al. |
| 5,537,315 A | 7/1996 | Mitcham |
| 5,553,282 A | 9/1996 | Parrish et al. |
| 5,583,922 A | 12/1996 | Davis et al. |
| 5,634,052 A | 5/1997 | Morris |
| 5,864,340 A | 1/1999 | Bertram et al. |
| 5,880,724 A | 3/1999 | Bertram et al. |
| 5,968,125 A | 10/1999 | Garrick et al. |
| 6,049,877 A | 4/2000 | White |
| 6,065,026 A | 5/2000 | Cornelia et al. |
| 6,128,653 A | 10/2000 | del Val et al. |
| 6,199,079 B1 | 3/2001 | Gupta et al. |
| 6,247,020 B1 | 6/2001 | Minard |
| 6,271,846 B1 | 8/2001 | Martinez et al. |
| 6,272,678 B1 | 8/2001 | Imachi et al. |
| 6,301,592 B1 | 10/2001 | Aoyama et al. |
| 6,366,920 B1 | 4/2002 | Hoose et al. |
| 6,377,948 B2 | 4/2002 | Kikuchi et al. |
| 6,381,744 B2 | 4/2002 | Nanos et al. |
| 6,385,642 B1 | 5/2002 | Chlan et al. |
| 6,393,407 B1 | 5/2002 | Middleton, III et al. |
| 6,405,238 B1 | 6/2002 | Votipka |
| 6,407,752 B1 | 6/2002 | Harnett |
| 6,430,575 B1 | 8/2002 | Dourish et al. |
| 6,437,803 B1 | 8/2002 | Panasyuk et al. |
| 6,463,343 B1 | 10/2002 | Emens et al. |
| 6,490,601 B1 | 12/2002 | Markus et al. |
| 6,510,430 B1 | 1/2003 | Oberwager et al. |
| 6,538,667 B1 | 3/2003 | Duursma et al. |
| 6,546,405 B2 | 4/2003 | Gupta et al. |
| 6,592,629 B1 | 7/2003 | Cullen et al. |
| 6,601,047 B2 | 7/2003 | Wang et al. |
| 6,658,167 B1 | 12/2003 | Lee et al. |
| 6,658,659 B2 | 12/2003 | Hiller et al. |
| 6,915,435 B1 | 7/2005 | Merriam |
| 6,918,082 B1 | 7/2005 | Gross et al. |
| 6,978,376 B2 | 12/2005 | Giroux et al. |
| 6,993,529 B1 | 1/2006 | Basko et al. |
| 6,993,661 B1 | 1/2006 | Garfinkel |
| 7,010,503 B1 | 3/2006 | Oliver et al. |
| 7,020,779 B1 | 3/2006 | Sutherland |
| 7,146,495 B2 | 12/2006 | Baldwin et al. |
| 7,178,110 B2 | 2/2007 | Fujino |
| 7,206,998 B2 | 4/2007 | Pennell et al. |
| 7,266,537 B2 | 9/2007 | Jacobsen et al. |
| 7,299,202 B2 | 11/2007 | Swanson |
| 7,299,502 B2 | 11/2007 | Schmeling et al. |
| 7,318,193 B2 | 1/2008 | Kim et al. |
| 7,321,539 B2 | 1/2008 | Ballantyne |
| 7,322,025 B2 | 1/2008 | Reddy et al. |
| 7,372,789 B2 | 5/2008 | Kuroda |
| 7,421,438 B2 | 9/2008 | Turski et al. |
| 7,440,967 B2 | 10/2008 | Chidlovskii |
| 7,574,048 B2 | 8/2009 | Shilman et al. |
| 7,584,196 B2 | 9/2009 | Reimer et al. |
| 7,587,327 B2 | 9/2009 | Jacobs et al. |
| 7,593,532 B2 | 9/2009 | Plotkin et al. |
| 7,624,189 B2 | 11/2009 | Bucher |
| 7,636,898 B2 | 12/2009 | Takahashi |
| 7,650,320 B2 | 1/2010 | Nakano |
| 7,676,792 B2 | 3/2010 | Irie et al. |
| 7,698,230 B1 | 4/2010 | Brown et al. |
| 7,757,168 B1 | 7/2010 | Shanahan et al. |
| 8,166,388 B2 | 4/2012 | Gounares et al. |
| 8,370,403 B2 | 2/2013 | Matsuki |
| 2001/0027420 A1 | 10/2001 | Boublik et al. |
| 2001/0032092 A1 | 10/2001 | Calver |
| 2002/0065879 A1 | 5/2002 | Ambrose et al. |
| 2002/0120474 A1 | 8/2002 | Hele et al. |
| 2002/0138476 A1 | 9/2002 | Suwa et al. |
| 2002/0194033 A1 | 12/2002 | Huff |
| 2002/0194578 A1 | 12/2002 | Irie et al. |
| 2002/0198743 A1 | 12/2002 | Ariathurai et al. |
| 2003/0101200 A1 | 5/2003 | Koyama et al. |
| 2003/0144887 A1 | 7/2003 | Debber |
| 2003/0191938 A1 | 10/2003 | Woods et al. |
| 2003/0200125 A1 | 10/2003 | Erlanger |
| 2003/0212610 A1 | 11/2003 | Duffy et al. |
| 2004/0039757 A1* | 2/2004 | McClure ........................ 707/201 |
| 2004/0059740 A1 | 3/2004 | Hanakawa et al. |
| 2004/0186750 A1 | 9/2004 | Surbey et al. |
| 2004/0193455 A1 | 9/2004 | Kellington |
| 2005/0071203 A1 | 3/2005 | Maus |
| 2005/0080804 A1 | 4/2005 | Bradshaw et al. |
| 2005/0097061 A1 | 5/2005 | Shapiro et al. |
| 2005/0137928 A1 | 6/2005 | Scholl et al. |
| 2005/0144195 A1 | 6/2005 | Hesselink et al. |
| 2006/0059418 A1 | 3/2006 | Elkady |
| 2006/0100912 A1 | 5/2006 | Kumar et al. |
| 2006/0184452 A1 | 8/2006 | Barnes et al. |
| 2006/0195491 A1 | 8/2006 | Nieland et al. |
| 2006/0195494 A1 | 8/2006 | Dietrich |
| 2006/0259524 A1 | 11/2006 | Horton |
| 2007/0006222 A1 | 1/2007 | Maier et al. |
| 2007/0016465 A1 | 1/2007 | Schaad |
| 2007/0061154 A1 | 3/2007 | Markvoort et al. |
| 2007/0067772 A1 | 3/2007 | Bustamante |
| 2007/0146823 A1 | 6/2007 | Borchers et al. |
| 2007/0186214 A1 | 8/2007 | Morgan |
| 2007/0244921 A1 | 10/2007 | Blair |
| 2007/0244935 A1 | 10/2007 | Cherkasov |
| 2007/0245230 A1 | 10/2007 | Cherkasov |
| 2007/0282927 A1 | 12/2007 | Polouetkov |
| 2008/0002830 A1 | 1/2008 | Cherkasov et al. |
| 2008/0040690 A1 | 2/2008 | Sakai |
| 2008/0091846 A1* | 4/2008 | Dang ........................... 709/246 |
| 2008/0243897 A1 | 10/2008 | Petri |
| 2009/0055242 A1 | 2/2009 | Rewari et al. |
| 2009/0119133 A1 | 5/2009 | Yeransian et al. |
| 2009/0328171 A1 | 12/2009 | Bayus et al. |
| 2010/0060926 A1 | 3/2010 | Smith et al. |
| 2010/0064230 A1 | 3/2010 | Klawitter et al. |

(56) References Cited

U.S. PATENT DOCUMENTS

| | | | |
|---|---|---|---|
| 2010/0064258 A1 | 3/2010 | Gorczowski et al. | |
| 2010/0064375 A1 | 3/2010 | Gorczowski et al. | |
| 2010/0076993 A1 | 3/2010 | Klawitter et al. | |
| 2010/0091317 A1 | 4/2010 | Williams et al. | |
| 2010/0161616 A1 | 6/2010 | Mitchell | |
| 2010/0179883 A1 | 7/2010 | Devolites | |
| 2010/0191785 A1 | 7/2010 | Serlet et al. | |
| 2011/0119574 A1 | 5/2011 | Rogers et al. | |
| 2011/0145037 A1 | 6/2011 | Domashchenko et al. | |
| 2011/0153560 A1 | 6/2011 | Bryant et al. | |
| 2011/0161375 A1 | 6/2011 | Tedder et al. | |
| 2011/0173153 A1 | 7/2011 | Domashchenko et al. | |
| 2011/0283177 A1 | 11/2011 | Gates et al. | |
| 2012/0150919 A1 | 6/2012 | Brown et al. | |
| 2012/0232934 A1 | 9/2012 | Zhang et al. | |
| 2012/0271657 A1 | 10/2012 | Anderson et al. | |
| 2013/0024418 A1* | 1/2013 | Sitrick et al. | 707/608 |
| 2013/0073942 A1* | 3/2013 | Cherkasov | 715/233 |

FOREIGN PATENT DOCUMENTS

| | | |
|---|---|---|
| CA | 2733857 A1 | 9/2010 |
| CA | 2761405 A1 | 6/2012 |
| CA | 2737734 A1 | 10/2012 |
| EP | 0585192 A1 | 3/1994 |
| JP | 60-41138 A | 3/1985 |
| JP | 3-282941 A | 12/1991 |
| JP | 4-373026 A | 12/1992 |
| WO | 2007/120772 A2 | 10/2007 |
| WO | 2007/120773 A2 | 10/2007 |
| WO | 2007/120774 A2 | 10/2007 |
| WO | 2010/030675 A1 | 3/2010 |
| WO | 2010/030676 A1 | 3/2010 |
| WO | 2010/030677 A1 | 3/2010 |
| WO | 2010/030678 A1 | 3/2010 |
| WO | 2010/030679 A1 | 3/2010 |
| WO | 2010/030680 A1 | 3/2010 |

OTHER PUBLICATIONS

Hwang, J. Y. (2009). Development of a multi-mode optical imaging system for preclinical applications in vivo. (Order No. 3368560, University of Southern California). ProQuest Dissertations and Theses, , 143. Retrieved from http://search.proquest.com/docview/304997952?accountid=14753. (304997952).*

"Update insurance template according to changes to policy" retrieved from URL=https://www.google.com/?tbm=pts on Sep. 24, 2012, 2 pages.

Brown et al., "Agency Management System and Content Management System Integration," Amendment filed Jan. 9, 2013, for U.S. Appl. No. 13/004,572, 23 pages.

Brown et al., "Agency Management System and Content Management System Integration," Office Action mailed Oct. 9, 2012, for U.S. Appl. No. 13/004,572, 24 pages.

Brown et al., "Agency Management System and Content Management System Integration," Office Action mailed Feb. 13, 2013, for U.S. Appl. No. 13/004,572, 29 pages.

Zhang et al., "Agency Management System and Content Management System Integration," U.S. Appl. No. 61/422,090, filed Dec. 10, 2010, 54 pages.

Zhang et al., "Automated Insurance Policy Form Generation and Completion," Amendment filed Oct. 2, 2012, for U.S. Appl. No. 13/046,501, 18 pages.

Zhang et al., "Automated Insurance Policy Form Generation and Completion," Office Action mailed Jun. 20, 2012, for U.S. Appl. No. 13/046,501, 22 pages.

"AMS Real-Time Getting Started Guide," AMS Services, Vertafore, Inc., 9 pages, 2008.

"VERITAS Replication Exec version 3.1 for Windows," Administrator's Guide, pp. i-20, 49-68, and 119-160, Dec. 2004, 100 pages.

Announcement, "Coming Attraction, AMS Invites you to a Special Sneak Preview," AMS Services, 1 page, Aug. 1, 2008.

Brochure, "AMS 360—Business Growth. Productivity. Proven Technology.," Vertafore, Inc., 8 pages, 2008.

Brown et al., "Agency Management System and Content Management System Integration," Amendment filed Apr. 12, 2013, for U.S. Appl. No. 13/004,572, 18 pages.

Brown et al., "Agency Management System and Content Management System Integration," filed Dec. 10, 2010, for U.S. Appl. No. 61/422,090, 54 pages.

Bryant et al., "Apparatus, Method and Article to Manage Electronic or Digital Documents in a Networked Enviornment," Amendment filed May 11, 2012, for U.S. Appl. No. 12/641,843, 24 pages.

Bryant et al., "Apparatus, Method and Article to Manage Electronic or Digital Documents in a Networked Enviornment," Amendment filed Sep. 19, 2012, for U.S. Appl. No. 12/641,843, 23 pages.

Bryant et al., "Apparatus, Method and Article to Manage Electronic or Digital Documents in a Networked Enviornment," Final Rejection mailed Jul. 19, 2012, for U.S. Appl. No. 12/641,843, 17 pages.

Bryant et al., "Apparatus, Method and Article to Manage Electronic or Digital Documents in a Networked Enviornment," Non- Final Office Action mailed Feb. 14, 2012, for U.S. Appl. No. 12/641,843, 15 pages.

Corriveau et al., "AMS Portal Server: Bridging the Gap Between Web Presentation and the Back Office," White Paper, AMS Services, 13 pages, 2008.

Snyder et al., "Apparatus, Method and Article to Automate and Manage Communications in a Networked Environment," filed Apr. 19, 2012, for U.S. Appl. No. 13/451,139, 70 pages.

Snyder et al., "Apparatus, Method and Article to Automate and Manage Communications in a Networked Environment," Office Action mailed Jun. 18, 2013, for U.S. Appl. No. 13/451,139, 24 pages.

Snyder et al., "Apparatus, Method and Article to Automate and Manage Communications to Multiple Entities in a Networked Environment," filed Apr. 19,2012, for U.S. Appl. No. 13/451,168, 82 pages.

Snyder et al., "Apparatus, Method and Article to Automate and Manage Communications to Multiple Entities in a Networked Environment," Office Action mailed Jun. 18, 2013, for U.S. Appl. No. 13/451,168, 27 pages.

Snyder et al., "Apparatus, Method and Article to Automate and Manage Electronic Documents in a Networked Enviornment," Office Action mailed Feb. 5, 2013, for U.S. Appl. No. 13/451,136, 22 pages.

Snyder et al., "Apparatus, Method and Article to Automate and Manage Electronic Documents in a Networked Enviornment," filed Apr. 19, 2012, for U.S. Appl. No. 13/451,136, 80 pages.

Snyder et al., "Apparatus, Method and Srticle to Provide an Insurance Workflow Management System," filed Aug. 29, 2012, for U.S. Appl. No. 13/598,297, 86 pages.

Tedder et al., "Systems, Methods and Articles for Template Based Generation of Markup Documents to Access Back Office Systems," Amendment filed May 3, 2012, for U.S. Appl. No. 12/647,235, 16 pages.

Tedder et al., "Systems, Methods and Articles for Template Based Generation of Markup Documents to Access Back Office Systems," Amendment filed Sep. 10, 2012, for U.S. Appl. No. 12/647,235, 21 pages.

Tedder et al., "Systems, Methods and Articles for Template Based Generation of Markup Documents to Access Back Office Systems," Final Office Action mailed Jul. 10, 2012, for U.S. Appl. No. 12/647,235, 20 pages.

Tedder et al., "Systems, Methods and Articles for Template Based Generation of Markup Documents to Access Back Office Systems," Non-Final Office Action mailed Feb. 3, 2012, for U.S. Appl. No. 12/647,235, 20 pages.

"Adobe Introduces Adobe Acrobat 3.0 Software," *PR Newswire,* Jun. 3, 1996, 3 pages.

"CoreData Inc. Announces Technology and Marketing Agreement with MobileStar Network Corp.," *Business Wire,* Aug. 26, 1998, 2 pages.

"CoreData Offers E-mail Connectivity for RemoteWorx," *Newsbytes News Network,* Sep. 18, 1998, 1 page.

"Free Sticky Notes software—Sticky Notes program MoRUN.net Sticker Lite," Jan. 11, 2006, retrieved from http://web.archive.org/web/20060112031435/http://www.sticky-notes.net/free/stickynotes.html, on Oct. 10, 2013, 2 pages.

(56) References Cited

OTHER PUBLICATIONS

"Internet lifts servers to 64 bits," *Electronic Engineering Times,* Dec. 23, 1996, 3 pages.
"NotesPlusPlus," Feb. 25, 2006, retrieved from http://web.archive.org/web/20060225020405/http://www.sharewareconnection.com/notesplusplus.htm, on Oct. 10, 2013, 2 pages.
"SPSS Unveils Aggressive Development Plans: 1999 Product Releases Will Focus on Scalability and Deployment Solutions for the Enterprise," *Business Wire,* Feb. 18, 1999, 3 pages.
"Windows XP: The Complete Reference: Using Files and Folders," Apr. 28, 2004, retrieved from http://web.archive.org/web/20040428222156/http://delltech.150m.com/XP/files/7.htm, on Oct. 10, 2013, 4 pages.
Extended European Search Report, dated Jul. 9, 2012, for Application No. 07755347.7, 8 pages.
Extended European Search Report, dated Jun. 14, 2012, for Application No. 07755348.5, 8 pages.
Extended European Search Report, dated Jun. 19, 2012, for Application No. 07755349.3, 8 pages.
Extended European Search Report, dated Jun. 14, 2012, for Application No. 07755350.1, 9 pages.
Fogel, "Open Source Development With CVS," Copyright 1999, 2000, retrieved from http://web.archive.org/web/20000815211634/http://cvsbook.red-bean.com/cvsbook.ps, on Oct. 10, 2013, 218 pages.
Gadia, "A Homogeneous Relational Model and Query Languages for Temporal Databases," *ACM Transactions on Database Systems* 13(4):418-448, Dec. 1988.
Gage, "Sun's 'objective' is to populate Java networks," *Computer Reseller News,* Apr. 15, 1996, p. 69, 2 pages.
International Search Report and Written Opinion, mailed Aug. 5, 2008, for PCT/US2007/009040, 7 pages.
International Search Report and Written Opinion, mailed Jul. 18, 2008, for PCT/US2007/009041, 8 pages.
International Search Report and Written Opinion, mailed Jul. 14, 2008, for PCT/US2007/009042, 6 pages.
International Search Report and Written Opinion, mailed Jul. 18, 2008, for PCT/US2007/009043, 9 pages.
Murdock, "Office Automation System for Data Base Management and Forms Generation," U.S. Appl. No. 07/471,290, filed Jan. 26, 1990, 163 pages.
Snodgrass et al., "Temporal Databases," IEEE Computer, Sep. 1986, pp. 35-42.

\* cited by examiner

OVERLAYING IMAGES IN AUTOMATED INSURANCE POLICY FORM GENERATION

BACKGROUND

1. Technical Field

This disclosure generally relates to data services, and to automated form generation and completion.

2. Description of the Related Art

Insurance agents (e.g., general agents) often compile a repository of insurance endorsement forms, organize that collection and maintain the format and version of the forms over time separately for various different insurance carriers. These processes consume a high number of hours of working time and, due to the fact that many of the forms have similar appearances and file names, such processes can be prone to user error. The insurance carrier delegates which forms belong on a policy and applies rules for determining when those forms are mandatory or optional.

Some existing insurance policy issuance utilities require that the general agent maintain insurance policy document templates (either in electronic or paper form) to which the user (e.g., general agent) must attach the proper policy jackets and include the proper state specific insurance policy stamps. Typically, a policy is provided in the form of a policy jacket including one or more paper documents. The time spent on this insurance policy form maintenance and generation in the process of issuing insurance policies can add up to hundreds of hours wasted each year, reducing the number of policies an individual insurance agent can process.

BRIEF SUMMARY

A computer-implemented method may be summarized as including receiving a first form in a first format, wherein the first form is an electronic form that is electronically fillable; electronically converting the first form to a second format to generate a second form in the second format, wherein the second form is an electronic form that is not electronically fillable; in response to receiving a client request, electronically communicating the second form to be displayed within a user interface of a client associated with the client request instead of electronically communicating the first form in the first format to be displayed within the user interface, wherein the second form as displayed within the user interface is substantially visually indistinguishable from the first form were the first form to be displayed within the user interface, and wherein the second format is a format such that an image file in the second format is able to have other images visually placed over an image stored in the image file in the second format within the user interface in a manner that data indicating a position of the other images relative to the image stored in the image file in the second format on which the other images are placed is able to be captured and stored using functionality of the client or a service accessed by the client; receiving data indicating a position of an overlay image overlaid on the second form, wherein the overlay image is stored in an electronic file with the overlay image ultimately to be overlaid on an image stored by an electronically fillable form; and generating a third form in the first format, wherein the third form is an electronic form that is electronically fillable, the generating including incorporating the overlay image on an image stored by the third form at a location on the image stored by the third form corresponding to the data indicating the position of the overlay image on the second form. The first format may be a format such that an image file in the first format is not able to have other images visually placed over an image stored in the image file in the first format within the user interface in such said manner relative to the image stored in the image file in the first format. The first format may be portable document format and the second format is Joint Picture Expert Group format.

The method may further include at least partially electronically filling the first form before electronically converting the first form. The first, second and third forms may be insurance policy forms.

The method may further include receiving insurance policy form data; and automatically determining a list of insurance policy forms based on the insurance policy form data, wherein the first form is one of the insurance policy forms on the determined list.

The method wherein the first form, the second form and the third form may be insurance policy forms may further include electronically attaching the third form to an insurance policy; and electronically communicating an access mechanism to the insurance policy to a user for insurance policy verification by the user. The overlay image may be an image of a state specific stamp for placement on insurance policy forms.

The method may further include receiving a plurality of files storing overlay images; and in response to receiving the client request, electronically communicating the plurality of files storing overlay images. the overlay images to be displayed within the user interface.

A system may be summarized as including a computer processor; and a non-transitory memory communicatively coupled to the computer processor having computer-executable instructions stored thereon that when executed by the computer processor cause the computer processor to: receive a first form in a first format, wherein the first form is an electronic form that is electronically fillable; electronically convert the first form to a second format to generate a second form in the second format, wherein the second form is an electronic form that is not electronically fillable; in response to receiving a client request, electronically communicate the second form to be displayed within a user interface of a client associated with the client request instead of electronically communicating the first form in the first format to be displayed within the user interface; receive data indicating a position of an overlay image overlaid on the second form, wherein the overlay image is stored in an electronic file with the overlay image ultimately to be overlaid on an image stored by an electronically fillable form; and generate a third form in the first format, wherein the third form is an electronic form that is electronically fillable, by incorporating the overlay image on an image stored by the third form at a location on the image stored by the third form corresponding to the data indicating the position of the overlay image on the second form. The second form as displayed within the user interface may be substantially visually indistinguishable from the first form were the first form to be displayed within the user interface. The second format may be a format such that an image file in the second format may be able to have other images visually placed over an image stored in the image file in the second format within the user interface in such a manner that data indicating a position of the other images relative to the image stored in the image file in the second format on which the other images are placed may be able to be captured and stored using functionality of the client or a service being accessed by the client. The first, second and third forms may be insurance policy forms.

The computer-executable instructions, when executed by the computer processor, may further cause the computer processor to: receive insurance policy form data; and automatically determine a list of insurance policy forms based on the insurance policy form data, wherein the first form is one of the insurance policy forms on the determined list.

The computer-executable instructions, when executed by the computer processor, may further cause the computer processor to: electronically attach the third form to an insurance policy; and electronically communicate an access mechanism to the insurance policy to a user for insurance policy verification by the user. The first format may be portable document format. The second format may be Joint Picture Expert Group format.

A non-transitory computer readable storage medium, may have computer computer-executable instructions stored thereon that when executed by a computer processor may cause the computer processor to perform: receiving a selection of a first form from a plurality of forms in a first format, wherein the plurality of forms are electronic forms and are electronically fillable in the first format; displaying within a user interface of a client a second form in a second format, wherein the second form is the first form converted to an electronic form that is not electronically fillable in the second format; displaying at least one overlay image on the user interface, wherein the overlay image is stored in an electronic file with the overlay image ultimately to be overlaid on an image stored by an electronically fillable form, the at least one overlay image available to be visually placed over the second form within the user interface on which the second form is displayed; receiving an indication of a location corresponding to a location on the second form on which the overlay image was visually placed within the user interface; and electronically communicating the indication of the location to enable generation a third form in the first format incorporating the overlay image on an image stored by the third form at a location on the image stored by the third form corresponding to the indication of the location. The second form as displayed in the user interface may be substantially visually indistinguishable from the first form, were the first form to be displayed within the client. The first format may be portable document format and the second format may be Joint Picture Expert Group format.

A computer-implemented method may be summarized as including receiving a first electronic form of a first file type that is electronically fillable, the first electronic form including data and fields and a having a first format, the fields of the first electronic form electronically fillable; generating a second electronic form of a second file type that is not electronically fillable, the second electronic form replicating the data, the fields and the format of the first electronic form, the fields of the second electronic form not electronically fillable, the second file type such that when the second electronic form is displayed by an element of a user interface, an image represented by an image file is selectively visually representable by the element of the user interface overlaying at least a portion of the second electronic form at a number of end user selectable positions; in response to receiving a client request, electronically communicating the second electronic form to be displayed by at least one element of a client user interface of a client associated with the client request instead of communicating the first electronic form; receiving via the client data indicative of user selected image and a user identified position for the image with respect to at least one element of the second electronic form; and generating a third electronic form of the first file type that is electronically fillable, the third electronic form replicating the data, the fields and the format of the first electronic form and including the user selected image at the user identified position, the fields of the first electronic form electronically fillable.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
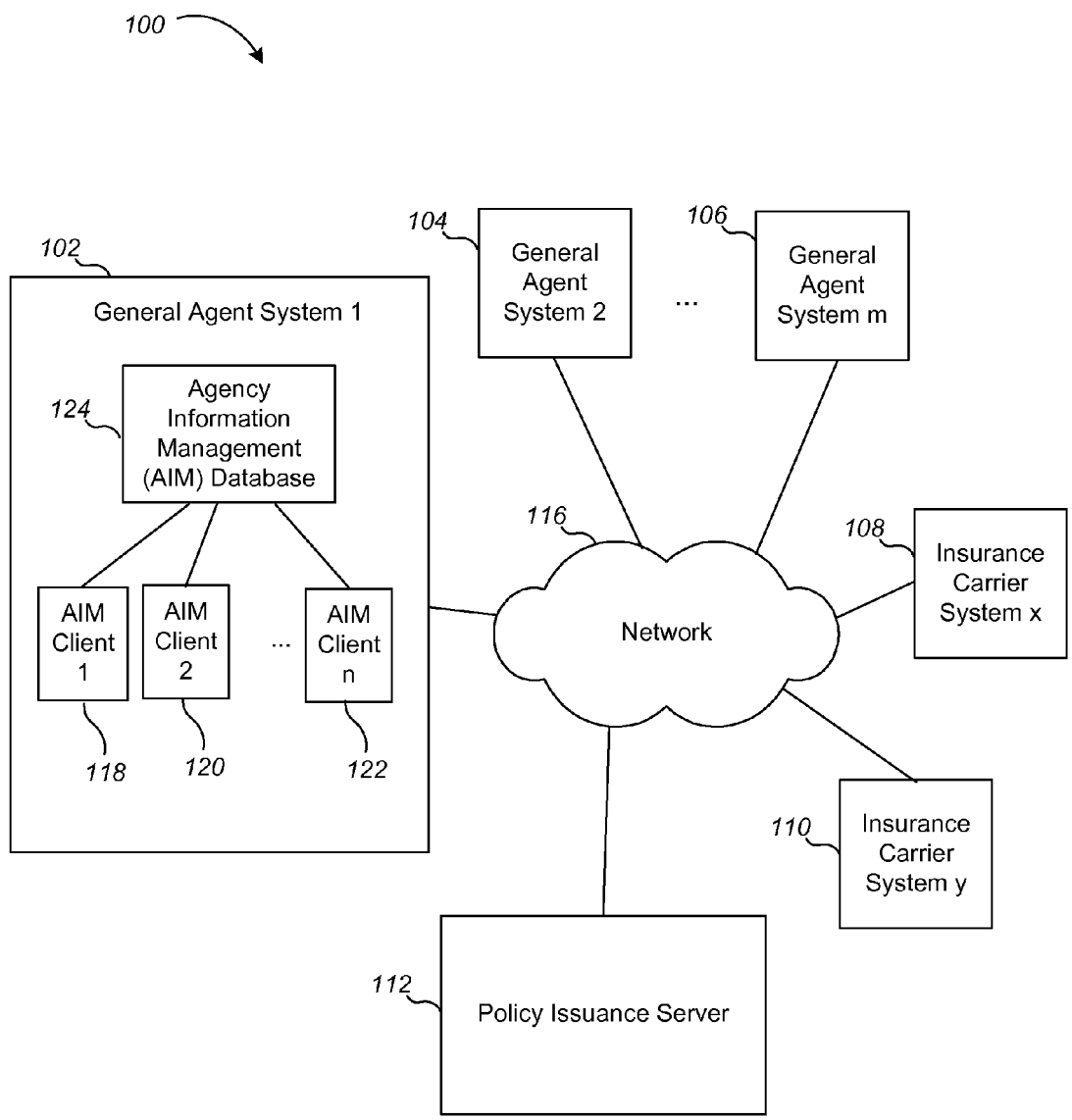
FIG. 1 is a system diagram of a networked environment, in which systems, devices and methods for overlaying of images in automated insurance policy form generation may be a part, or in which they may be implemented, according to one illustrated embodiment.

FIG. 1 is a system diagram of a networked environment, in which systems, devices and methods for overlaying images in automated insurance policy form generation may be a part, or in which they it be implemented, according to one illustrated embodiment.

The networked environment 100 may include one or more general agent (e.g., insurance agent) systems, such as general agent system 1 102, general agent system 2 104, and general agent system m 106; one or more insurance carrier systems, such as insurance carrier system x 108 and insurance carrier system y 110; and a policy (e.g., insurance policy) issuance server 112. General agent system 1 102, general agent system 2 104, general agent system m 106, insurance carrier system x 108, insurance carrier system y 110, and the policy issuance server 112 may all be communicatively coupled via a network 116. Alternatively, one or more of the systems or devices may be located on a single system and/or at a single physical location. Additional systems and devices may also be present, but are not illustrated for clarity of presentation.

A general agent system, e.g., general agent system 102, may include an agency information management (AIM) database 124 that stores insurance customer or property data included, or that may be included, on an insurance policy. Other insurance policy information may also be stored on the AIM database 124. One or more AIM clients, such as AIM client 1 118, AIM client 2 120 and AIM client n 122, may be communicatively connected to the AIM database 124 such that the insurance customer data or property data can be collected and stored in the AIM database 124 and subsequently accessed, modified or deleted via the one or more AIM clients 118, 120, 122. For example, in some cases a server installation of the AIM database is shared to the AIM clients 118, 120, 122. This may be implemented using Citrix® networking software provided by Citrix Systems, Inc. located in Fort Lauderdale, Fla. However, other networking software may instead or also be used. The AIM clients 118, 120, 122 retrieve raw policy data from the AIM database 124 and convert that data into a standardized format such as Association for Cooperative Operations Research and Development Extensible Markup Language (ACORD XML). That XML is sent to the policy issuance server 112 over network 116. However, the raw data may be converted into other standardized formats including other declarative programming language formats, among others.

The policy issuance server 112 may provide the general agent systems 102, 104, 106 the ability to process and issue insurance policies and policy endorsements using a policy issuance Web service of the policy issuance server 112. The policy issuance and policy endorsement process may include customized automated compiling, completion, validation and/or verification, and generation of various policy forms and forms packages originating from or provided by the one or more insurance carriers 108, 110. This policy issuance and policy endorsement process may be performed using insurance customer or property data information gathered by the one or more general agent systems 102, 104, 106 and/or provided by the one or more general agent systems 102, 104, 106 to the policy issuance server 112. For example, general agent system 1 102 may electronically collect data from an insurance customer and provide such data to the policy issuance server 112 in a specified format. The policy issuance server 112 will then compile that data and automatically complete the applicable insurance policy forms for the particular insurance carrier (e.g., insurance carrier 110) based on form templates generated by the policy issuance server 112, insurance carrier 110 and/or the general agent system 102. The policy issuance server 112 may then communicate the completed insurance policy package back to the general agent system 102 for further verification and/or validation before ultimately issuing the policy. Also, the policy issuance server 112 may provide the ability for the user at the general agent system 102 to customize the forms including electronically placing and overlaying state specific stamps or other images on the applicable forms to be attached to the policy.

The network 116 may be any computer network, telecommunications network or combination of telecommunications and computer networks that enables communication between the various systems and entities connected to the network 116 shown in FIG. 1. General agent system 1 102, general agent system 2 104, general agent system m 106, insurance carrier system x 108, insurance carrier system y 110, and the policy issuance server 112 may be additionally or optionally linked by one or more other communication links or networks that comprise network 116. For example, a communications network of network 116 may include a local area network that uses wireless fidelity (Wi-Fi) high frequency radio signals to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the various entities and systems shown in FIG. 1.

The network 116 may comprise connections to the general agent system 1 102, general agent system 2 104, general agent system m 106, insurance carrier system x 108, insurance carrier system y 110, and the policy issuance server 112 such that the policy issuance server 112 may provide the general agent systems 102, 104, 106 the ability to process and issue insurance policies and policy endorsements using the policy issuance Web service of the policy issuance server 112, and may itself represent multiple interconnected networks. For instance wired and wireless enterprise-wide computer networks, intranets, extranets, and/or the Internet may be included in or comprise a part of network 116. Embodiments may include various types of communication networks including other telecommunications networks, cellular networks, and other mobile networks. There may be any variety of computers, switching devices, routers, bridges, firewalls, edge devices, multiplexers, phone lines, cables, telecommunications equipment and other devices within network 116 and/or in the communications paths between the systems and entities of FIG. 1.

In accordance with an aspect of the disclosure, the systems and/or systems shown in FIG. 1 may contain discrete functional program modules that might make use of an application programming interface (API), or other object, software, firmware and/or hardware, to request or provide services of one or more of the other entities or systems within or connected to the network 116. For example, communication can be provided over a communications medium, e.g., client and server systems running on any one of the systems or systems of the entities shown in FIG. 1.

These client and server systems may be communicatively coupled to one another via transmission control protocol/internet protocol (TCP/IP) connection(s) for high-capacity communication. The "client" is a member of a class or group that uses the services of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer or device, e.g., a server. Any system in FIG. 1, including the general agent system 1 102, general agent system 2 104, general agent system m 106, insurance carrier system x 108, insurance carrier system y 110, the policy issuance server 112, the AIM database 124 and the one or more AIM clients 118, 120, 122, can be considered a client, a server, or both, depending on the circumstances.

Although the physical environment of the network 116 may have connected devices such as computers, the physical environment may alternatively have or be described as comprising various digital devices such as personal digital assistants (PDAs), televisions, MP3 players, etc., software objects such as interfaces, Component Object Model (COM) objects and the like.

There are a variety of systems, components, and network configurations that may also support distributed computing environments within the network 116. For example, computing systems may be connected together within the network 116 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of the network 116.

Figure 2:
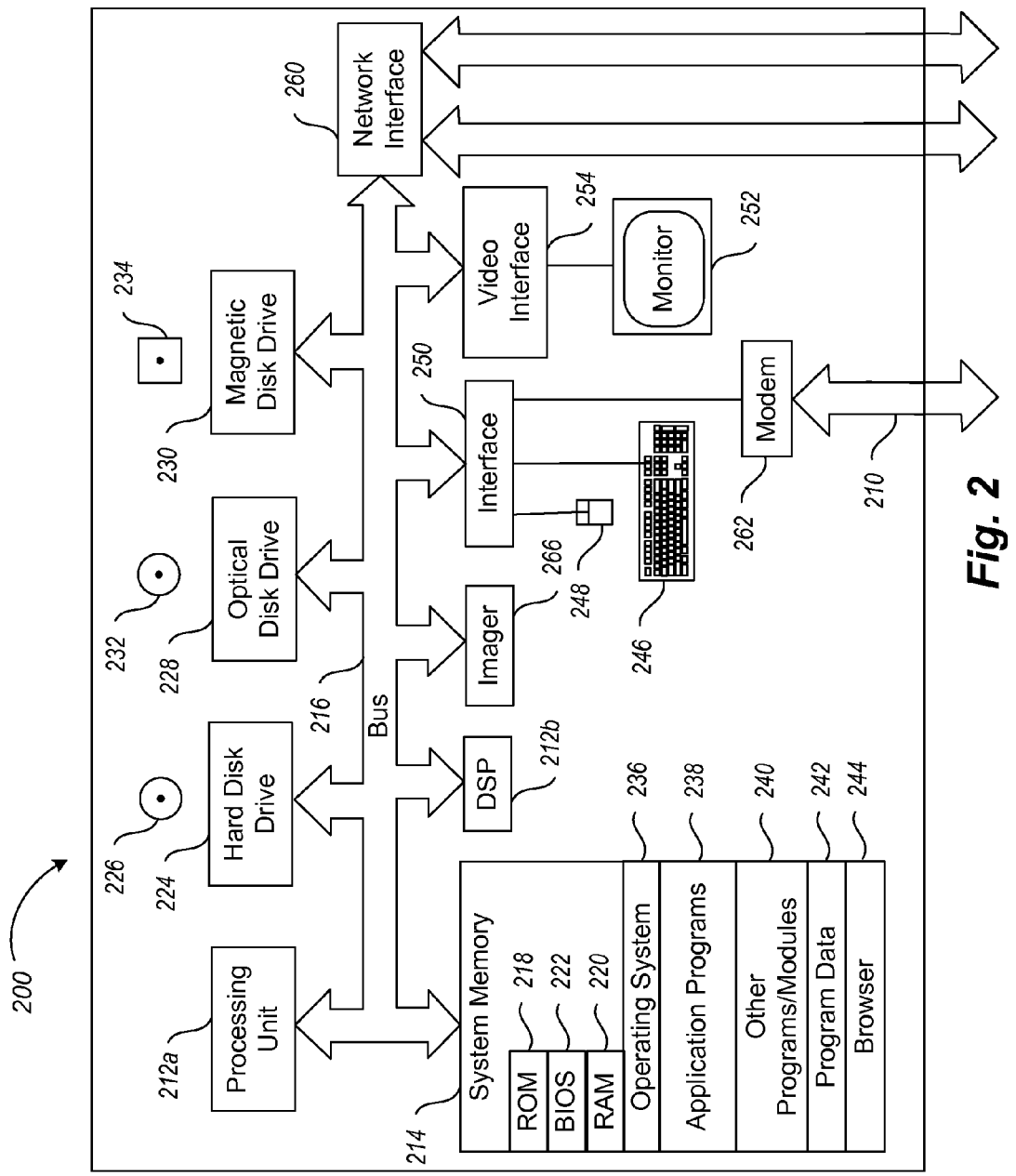
FIG. 2 is a schematic diagram of an example computer system of any one of the entities or systems of FIG. 1, suitable for implementing overlaying of images in automated insurance policy form generation, according to one illustrated embodiment.

FIG. 2 is a schematic diagram of an example computer system of any one of the entities or systems of FIG. 1, suitable for implementing overlaying images in automated insurance policy form generation, according to one illustrated embodiment.

The computer system 200 is suitable for implementing systems, devices and methods for overlaying images in automated insurance policy form generation, according to one illustrated embodiment. The computer system 200 will at times be referred to in the singular herein, but this is not intended to limit the embodiments to a single device since in typical embodiments, there may be more than one computer system or devices involved. Unless described otherwise, the construction and operation of the various blocks shown in FIG. 2 are of conventional design. As a result, such blocks need not be described in further detail herein, as they will be understood by those skilled in the relevant art.

The computer system 200 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), programmable gate arrays such as field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the computer system 200, such as during start-up.

The computer system 200 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette.

The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer readable instructions, data structures, program modules and other data for the computer system 200. Although the depicted computer system 200 is illustrated employing a hard disk 224, optical disk 228 and magnetic disk 230, those skilled in the relevant art will appreciate that other types of computer-readable storage media that can store data accessible by a computer may be employed, such as magnetic cassettes, flash memory, digital video disks ("DVD"), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 212*a*.

Program modules can be stored in the system memory 214, such as an operating system 236, one or more application programs 238, other programs or modules 240 and program data 242. Application programs 238 may include instructions that cause the processor(s) 212 to provide overlaying images in automated insurance policy form generation such as, for example, overlaying images in automated insurance policy form generation performed during the policy issuance service provided by the policy issuance server 112 based on data received by the general agent system 102 including indications of where on a form an image is to be placed. The generated forms are generally printable and include documents and printable images. Other program modules 240 may include instructions for handling security such as password or other access protection and communications encryption. The system memory 214 may also include communications programs, for example, a Web client or browser 244 for permitting the computer system 200 to access and exchange data with sources such as Web sites of the Internet, corporate intranets, extranets, or other networks and devices as described herein, as well as other server applications on server computing systems. The browser 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft of Redmond, Wash.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the magnetic disk 234 of the magnetic disk drive 230. For example, a data of policy forms may be stored on the hard disk drive 224, the optical disk 232 of the optical disk drive 228 and/or the magnetic disk 234 of the magnetic disk drive 230, as well as one or more images which may be placed on the forms.

An operator can enter commands and information into the computer system 200 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The computer system 200 can include other output devices, such as speakers, printers, etc.

The computer system 200 can operate in a networked environment using logical connections to one or more remote computers and/or devices as described above with reference to FIG. 1. For example, the computer system 200 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks.

Although not required, the embodiments will be described in the general context of computer-executable instructions, such as program application modules, objects, or macros stored on computer- or processor-readable storage media and executed by a computer or processor. Those skilled in the relevant art will appreciate that the illustrated embodiments as well as other embodiments can be practiced with other system configurations and/or other computing system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network such as network 116. In a distributed computing environment, program modules may be located in both local and remote memory storage devices.

AIM systems may offer the user built-in options to issue insurance policies. These built-in options vary from internally generating the document directly from policy data, to sending policy data to word processing utilities which generate the actual document using templates. External policy issuance utilities may also follow this model, and accept policy data which is then placed in pre-defined locations and eventually produce a printable policy document in a similar manner. Although each of these approaches addresses certain difficulties inherent to issuing insurance policies, there still exists the potential of user error surrounding the issuance process and may also involve an excessive amount of time to maintain these systems.

Advantageously, the embodiments of the general agent system described herein instead or additionally provide an integration library and associated programs that produce policy data in a standardized declarative language format (e.g., in Association for Cooperative Operations Research and Development Extensible Markup Language (ACORD XML)), which is then transmitted to the policy issuance server 112. Note that the transmitted XML need not communicate to the policy issuance server 112 where to place the data on any particular policy document or form, and the user (e.g., the general agent) need not have seen the policy form templates nor its endorsement forms prior to using the system. This substantially reduces potential of user error surrounding the policy issuance process and also reduces the amount of time to maintain the general agent systems.

Figure 3:
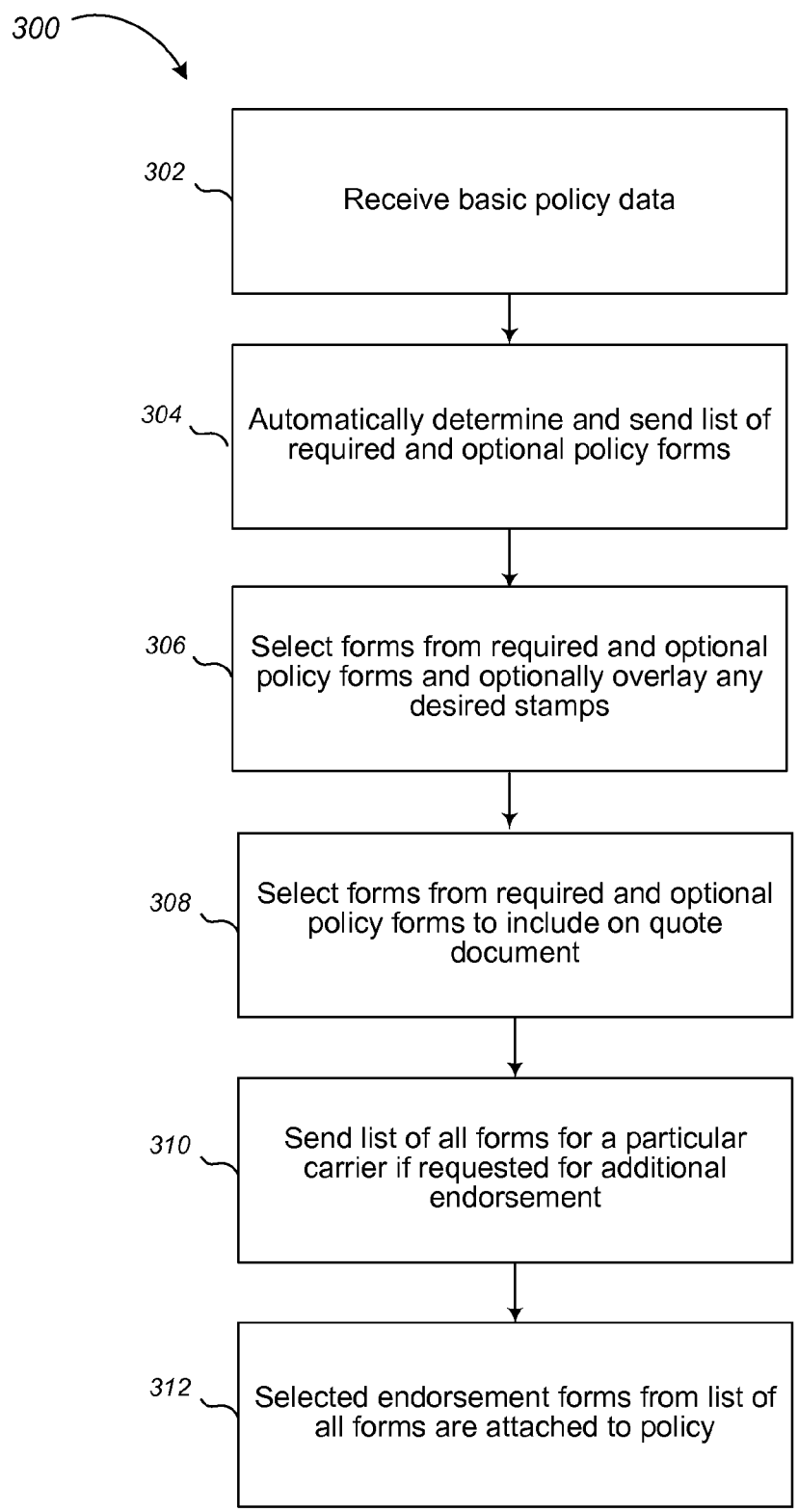
FIG. 3 is a flow diagram illustrating an automated process of insurance policy quoting of which overlaying images in automated insurance policy form generation may be a part, according to one illustrated embodiment.

FIG. 3 is a flow diagram illustrating an automated process 300 of insurance policy quoting of which overlaying images in automated insurance policy form generation may be a part, according to one illustrated embodiment.

The process 300 starts at 302, wherein the basic policy data is received by the policy issuance server (e.g., in ACORD XML format). For example, the general agent or other user may enter basic policy data into the general agent system, and then send a request that includes the basic policy data to the policy issuance server for a list of required and optional policy forms based on the received basic policy data.

At 304, based on the received policy data, the policy issuance server automatically determines and sends the list of required and optional policy forms to the general agent system. The policy issuance server may use the received policy data to determine the listed optional forms, and those that are marked as required for the particular policy. The policy issuance server may automatically apply custom business rules for each individual insurance carrier to compile policy documents, automating an otherwise typically error-prone and time consuming process. The policy issuance server may also provide the general agent the ability to overlay or place their own images within a Web browser interface on top of a carrier's forms. This need may arise in instances where the general agent wants to include state specific stamps on policy forms in accordance with state specific insurance laws and regulations. The policy issuance server may automatically generate the insurance policy form templates based on forms previously received corresponding to the applicable insurance carrier and any customized insurance carrier forms on which stamps have been placed by the general agent, and then populate the forms with the appropriate received basic policy data. Alternatively, the forms may be populated with the appropriate received basic policy data and then the general agent may customize the forms by electronically placing their own images within a Web browser interface on top of the completed forms.

At 306, for example, the general agent may select forms from the list of required and optional policy forms and optionally overlay any state specific desired stamps or other images on the selected forms within a graphical user interface of a Web browser. The forms may be accessed at the policy issuance server, general agent system, or any other system or database in which the forms are stored. This process is detailed further in FIGS. 7-14 and the accompanying description.

At 308, the general agent system selects forms from the required and optional policy forms to include on an insurance quote document. Such may be performed via the user interface.

At 310, the policy issuance server may send a list of all forms for a particular carrier to the general agent if requested for an additional endorsement to the policy being quoted. For example, if the user decides that an endorsement form that is not listed needs to be attached to the policy, the user can request a list of all of the forms the corresponding carrier has made available to the general agent. At this point, the general agent may again select forms from the list of all of the forms the corresponding carrier has made available to the general agent and optionally overlay any state specific desired stamps or other images on the selected forms within a graphical user interface of a Web browser.

At 312, the general agent system electronically attaches the selected electronic endorsement forms to the electronically stored policy. For example, the general agent system may include the selected electronic endorsement forms in the same folder or object in which the electronically stored policy is stored or associated, or may otherwise electronically associate the selected electronic endorsement forms to the electronically stored policy.

Figure 4:
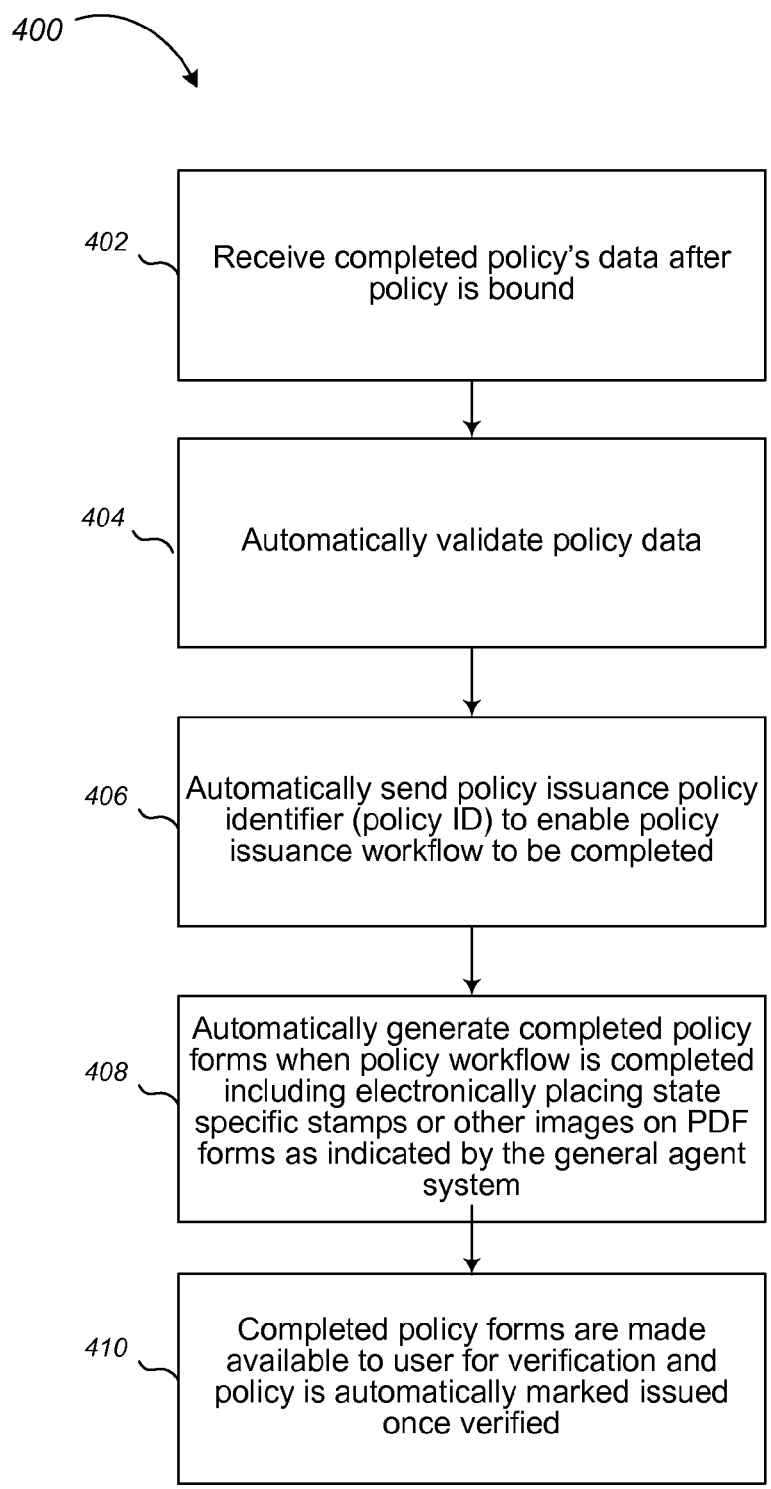
FIG. 4 is a flow diagram illustrating an automated process of insurance policy issuance of which overlaying images in automated insurance policy form generation may be a part, according to one illustrated embodiment.

FIG. 4 is a flow diagram illustrating an automated process 400 of insurance policy issuance of which overlaying images in automated insurance policy form generation may be a part, according to one illustrated embodiment.

At 402, after the policy has been bound, the general agent system may then submit the completed policy's data, exported to ACORD XML, to the policy issuance server.

At 404, the policy issuance server automatically validates the policy data to ensure the policy is valid. This validation may include electronically automatically checking the policy data against formatting rules, checking for data integrity and checking that the data complies with applicable insurance regulations and policy issuance procedures.

At 406, if the policy is valid, the policy issuance server sends a policy issuance policy identifier (policy ID) to enable the policy issuance workflow to be completed by the general agent. For example, this new ID is used to generate a uniform resource locator (URL) to a Web page on the policy issuance server that will allow the user to complete the service's issuance workflow.

At 408, based on the received policy data, the policy issuance server automatically generates completed policy forms (e.g., in Adobe® portable document format (PDF)) when the policy workflow is completed. For example, the policy issuance server may automatically generate the insurance policy form templates based on forms received from the corresponding insurance carrier, including electronically placing state specific stamps or other images on the PDF forms as previously indicated by the general agent system. The policy issuance server may then populate the forms with the applicable received policy data. Alternatively, the policy issuance server may first populate the forms with the applicable received policy data and then generate the final forms by electronically placing the state specific stamps or other images on the populated forms as indicated by the general agent system. In another embodiment, the PDF forms may have already had the state specific stamps or other images electronically placed or incorporated into the PDF forms as previously indicated by the general agent system before policy issuance validation.

At 410, the completed policy forms are made available to the user for verification and the policy is automatically marked issued once verified. For example, the general agent system polls another generated URL, again using the policy ID, until a link to the issued policy's PDF URL is available. Once the PDF's link is retrieved, the PDF is downloaded, saved to the general agent system's attachment directory, logged to the general agent system's activity log and displayed to the user for validation. The policy can be modified and re-issued, and different images overlaid as needed on the various policy forms, until the policy has been marked as issued on policy issuance server. After the policy has been issued and verified, the general agent can then mail out the policy (e.g., physically mailing a paper form of the policy). This also marks the policy as completed on the policy issuance server. Once the policy has been mailed out, it may be modified by an endorsement.

Figure 5:
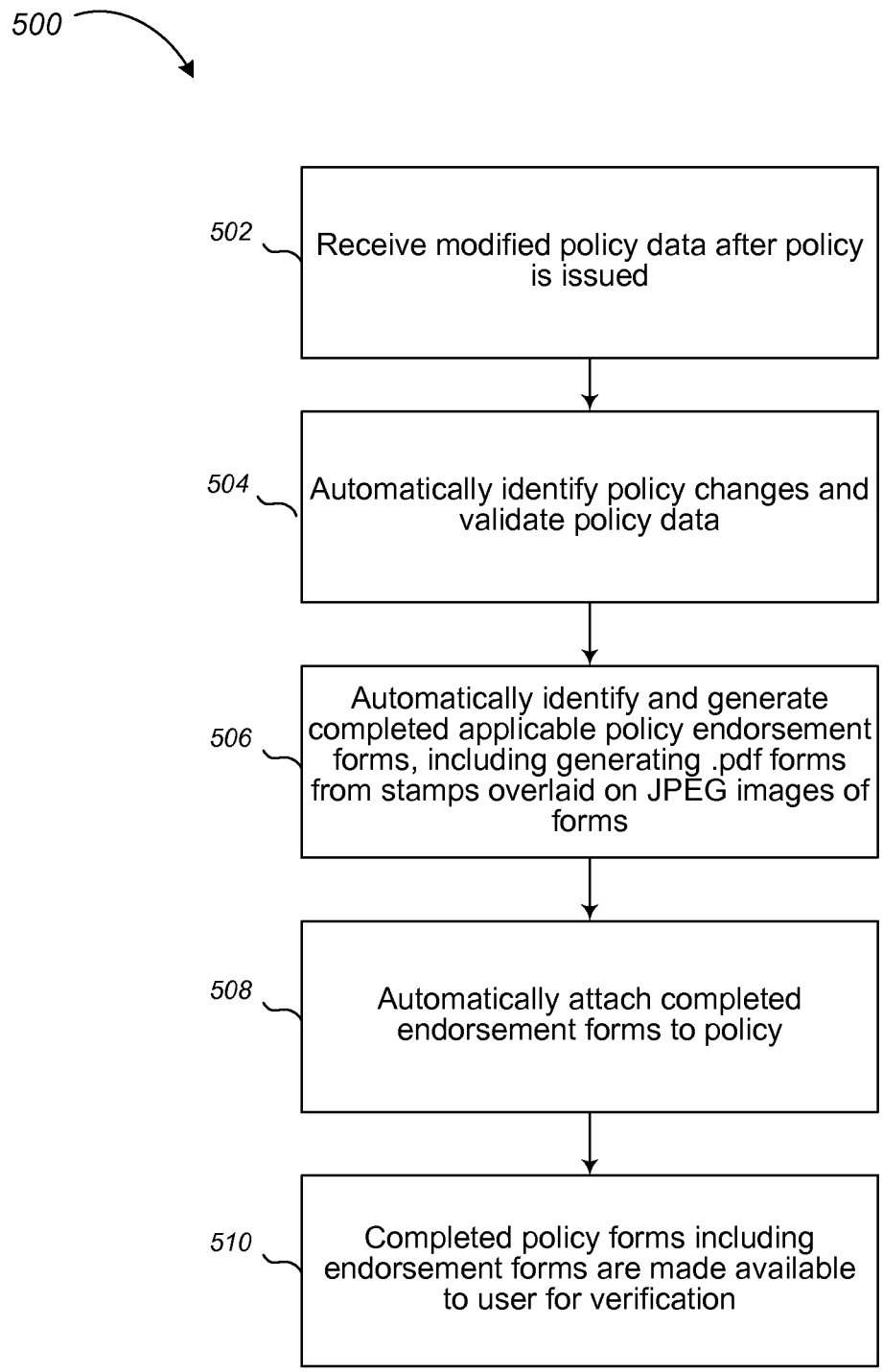
FIG. 5 is a flow diagram illustrating an automated process of insurance policy endorsement of which overlaying images in automated insurance policy form generation may be a part, according to one illustrated embodiment.

FIG. 5 is a flow diagram illustrating an automated process 500 of insurance policy endorsement of which overlaying images in automated insurance policy form generation may be a part, according to one illustrated embodiment.

At 502, the policy issuance server receives modified policy data after the policy is issued. For example, the general agent system may electronically communicate updates or changes in the policy data (e.g., insured or beneficiary name changes, coverage changes, etc.) to the policy issuance server.

At 504, the policy issuance server automatically identifies policy changes and validates policy data. For example, the policy issuance server may compare the received modified policy data to the existing policy data to identify particular changes. The policy issuance server may perform the validation on the identified changes. The validation may include electronically automatically checking the policy data against formatting rules, checking for data integrity and checking that the data complies with applicable insurance regulations and policy issuance procedures.

At 506, based on the received modified policy data, the policy issuance server automatically identifies and generates completed applicable policy endorsement forms. For example, the policy issuance server may automatically generate the insurance policy endorsement form templates based on forms received from the corresponding insurance carrier, including electronically placing state specific stamps or other images on the .pdf forms as previously indicated by the general agent system. The policy issuance server may then populate the forms with the applicable received policy data. Alternatively, the policy issuance server may first populate the forms with the applicable received policy data and then generate the final forms by electronically placing the state specific stamps or other images on the populated forms as indicated by the general agent system. In another embodiment, the PDF forms may have already had the state specific stamps or other images electronically placed or incorporated into the .pdf forms as previously indicated by the general agent system before modified policy data has been received or before policy changes have been identified.

At 508, the policy issuance server automatically electronically attaches the completed endorsement forms to the electronically stored policy. For example, the policy issuance server may include the completed endorsement forms in the same folder or object in which the electronically stored policy is stored or associated, or may otherwise electronically associate the completed endorsement forms to the electronically stored policy.

At 510, the completed policy forms including endorsement forms are made available to the user for verification (e.g., by the policy issuance server automatically posting a link to the completed endorsement forms or sending a link to the completed endorsement forms to the general agent system).

Figure 6:
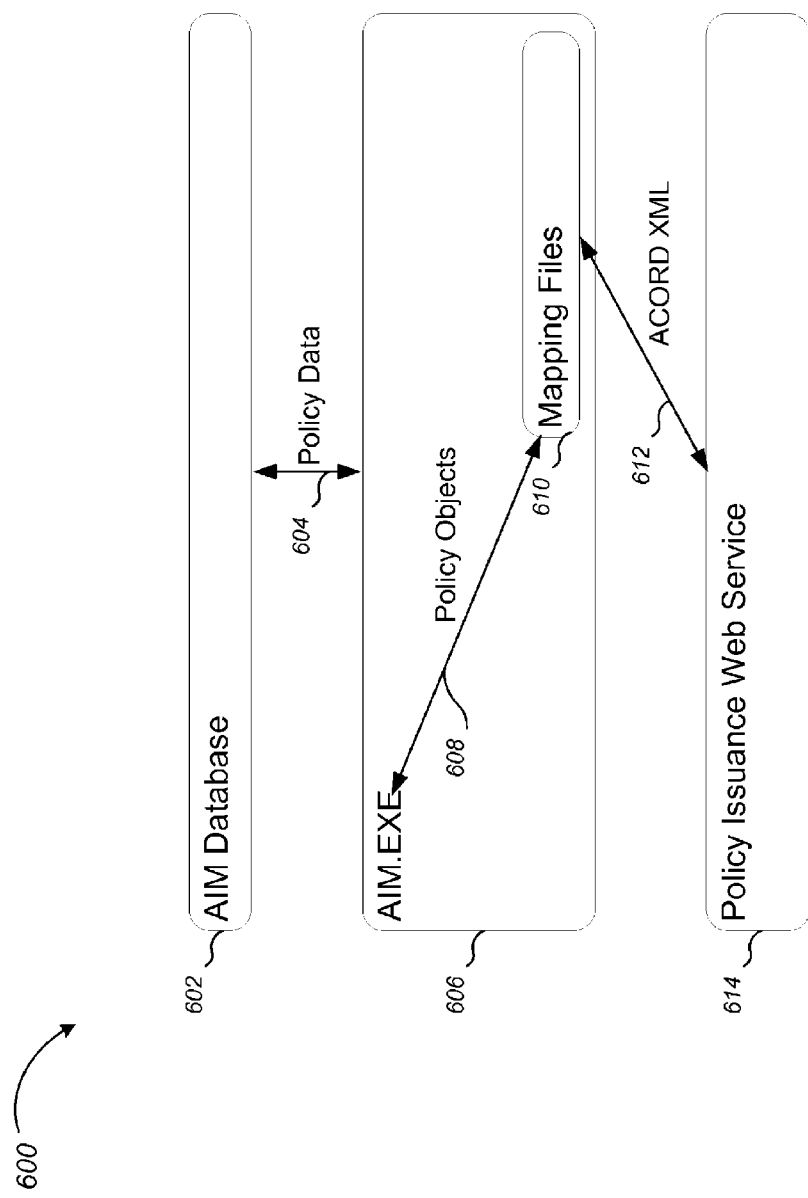
FIG. 6 is a block diagram showing the flow of data between components of a policy issuance system which implements overlaying of images in automated insurance policy form generation, according to one illustrated embodiment.

FIG. 6 is a block diagram showing the flow of data 600 between components of a policy issuance system which implements overlaying of images in automated insurance policy form generation, according to one illustrated embodiment.

Internally, the general agent system may use mapping files 610 to export policy data 604 retrieved from the AIM database 602 as valid ACORD XML 612. These mapping files 610 may also be formatted as XML and are distributed with the AIM client 606 software (e.g., AIM.exe). These mapping files 610 can be broken into parts, which are compiled into a full map file before being processed by AIM client software 606. The appropriate mapping files are loaded based on the policy's line(s) of business that are currently being exported. Before the mapping files are processed, the raw policy data 604 is loaded into policy objects 608 and it is these policy objects 608 that are directly mapped to ACORD XML. The policy data may also include information indicating the location on particular forms of the policy on which to overlay particular images (e.g., state specific stamps) as well as the size of the image to be overlaid on the form.

In the mapping files 610, each of the policy objects 608 are represented as data sources and the pieces of data held by the object are represented as fields. The AIM client software 606 processes the map files sequentially, allowing the map files to dictate how the policy's objects are accessed and what data is being exported. The mapping files 610 takes these data sources and fields, and places them into ACORD XML nodes 612. The latter part of this process is also performed sequentially, allowing the AIM client software 606 to adhere to the ordering of the mapped ACORD XML nodes 612. This ACORD XML 612 is then communicated to the policy issuance Web service 614 such that policy issuance server may automatically generate the insurance policy form templates, including incorporating any state specific stamps on the forms. this form generation may be based on the information indicating the location on particular forms of the policy on which to overlay particular images or stamps and based on forms received from the corresponding insurance carrier or other sources. The policy issuance Web service 614 may then populate the forms with the applicable policy data of the received ACORD XML 612.

Figure 7:
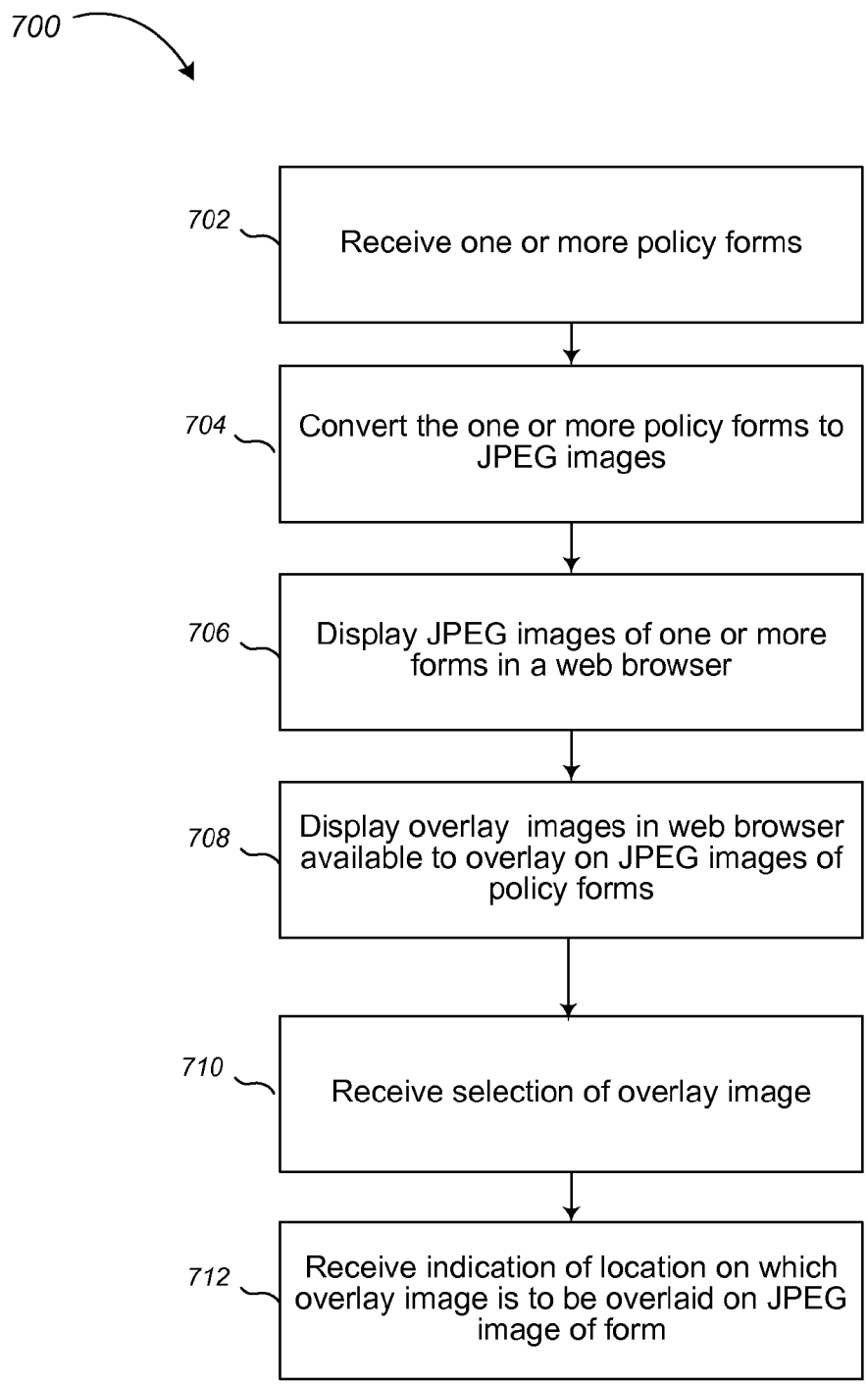
FIG. 7 is a flow diagram illustrating a process of overlaying images in automated insurance policy form generation, according to one illustrated embodiment.

FIG. 7 is a flow diagram illustrating a process 700 of overlaying images in automated insurance policy form generation, according to one illustrated embodiment.

Referring also again to FIG. 1, the general agent system 102 may, for example, use a Web browser interface to access the policy issuance server 112 and view insurance policy form templates, which are often in PDF format. However, traditionally there has not been a way to view a PDF file in a Web browser with the ability to overlay an image (e.g., a state specific stamp) with mouse control directly on top of the PDF and incorporate the overlay image into the PDF at the corresponding location. The process 700 described below provides a solution to this problem that enables a general agent to use the general agent system 102 to visually place the image on the insurance form template within the Web browser. In particular, the user selects the desired image to be placed on the form template by positioning the selected image on the form template by clicking a mouse button while the cursor is pointing at the image on the image and dragging the image across the screen to the desired position on the form template. The process 700 of overlaying images provides one embodiment of overlaying images within a Web browser as part of or separate from the automated policy issuance process described herein.

At 702, the applicable policy forms are received by the policy issuance server. These may be received from the insurance carrier, general agent or other party and may be in PDF format, for example.

At 704, the policy issuance server converts the one or more received electronic forms stored in an electronic file from the received file type into another file type, e.g., from PDF format to Joint Picture Expert Group (JPEG or JPG). For example, the received file type format may support an electronically fillable form (e.g., the form stored in the file having the received file type format has included form related tags or metadata having to do with particular form fields included in the file) and the file type format into which the form is converted stores an image of the original electronic form, but is not electronically fillable. The particular file type format to which the forms are being converted, for example, is one in which images in such a format may have other images visually placed over them within a graphical user interface of a Web browser, or of a Web page displayed in the Web browser, in such a manner that the position of the other image relative to the image on which it is placed is captured and stored using the functionality of the Web browser or application being accessed by the Web browser. Also, if a client other than a Web browser is being used to access the forms, the particular format to which the forms are being converted, for example, is one in which images in such a format may have other images visually placed over them within the particular type of client being used in such a manner that the position of the other image relative to the image on which it is placed is stored using functionality of the particular client or application being accessed by the client.

At 706, the converted forms are displayed in the Web browser or other client. For example, the policy issuance server responds to a request received via the Web browser and displays the converted image or images (e.g., JPEG images) corresponding to a particular form received in a different format (e.g., PDF format). In one embodiment, the general agent uses the general agent system to access various forms or form templates on the policy issuance server and the policy issuance server responds by displaying the converted form or group of forms requested within the Web browser of the general agent system. Alternatively, the policy issuance server may wait to convert the form or form template (e.g., from PDF to a JPEG image) until the request is received from the general agent system to access the particular form or form template on the policy issuance server. In various other embodiments, these converted forms or form templates may be stored at the policy issuance server, general agent system, or any other third party system or database.

At 708, one or more of the various images (e.g., state specific stamps) that are available to be placed on or overlaid on one or more of the displayed converted forms are also displayed. For example, the policy issuance server responds to a request received via the Web browser and displays images that are available to be placed on or overlaid on one or more of the displayed converted forms. These various images may be received from the insurance carrier, general agent or other party and may be in various formats, for example, and may have also been previously converted to JPEG or other format (e.g., from PDF to a JPEG image). In various other embodiments, these images may be stored at the policy issuance server, general agent system, or any other third party system or database.

At 710, an indication of a location on which the overlay image is to be overlaid on a particular form or form template is received. For example, within the Web browser of the general agent system, the general agent selects (e.g., clicks on) a particular displayed state specific stamp icon and drags the selected icon to a location on a particular form or form template displayed within the Web browser on which the general agent wants the stamp to be placed. Since the particular form or form template displayed within the Web browser is in JPEG format (e.g., as opposed to its original PDF format), the Web browser has the ability to overlay an image (e.g., the state specific stamp) with mouse control directly on top of the form or form template displayed within the Web browser. Thus, displaying the JPEG image of each PDF page of the form or form template within the Web browser instead of the original PDF of the form or form template gives the user the impression that they are placing the overlay image directly on the PDF document. The size of the overlay image, color of the overlay image, and orientation of the overlay image may also be selected and indicated within the Web browser.

Other embodiments may include various other ways of selecting the overlay image using various applicable GUI controls. Also, other embodiments may include various other ways of indicating the location on which the overlay image is to be placed on a particular form and the size of the overlay image including, but not limited to: entering a name or a tag of the overlay image, directly entering coordinates and dimensions of the overlay image, dragging a corner of a selection box which indicates the size and location of the overlay image, etc.

Figure 8:
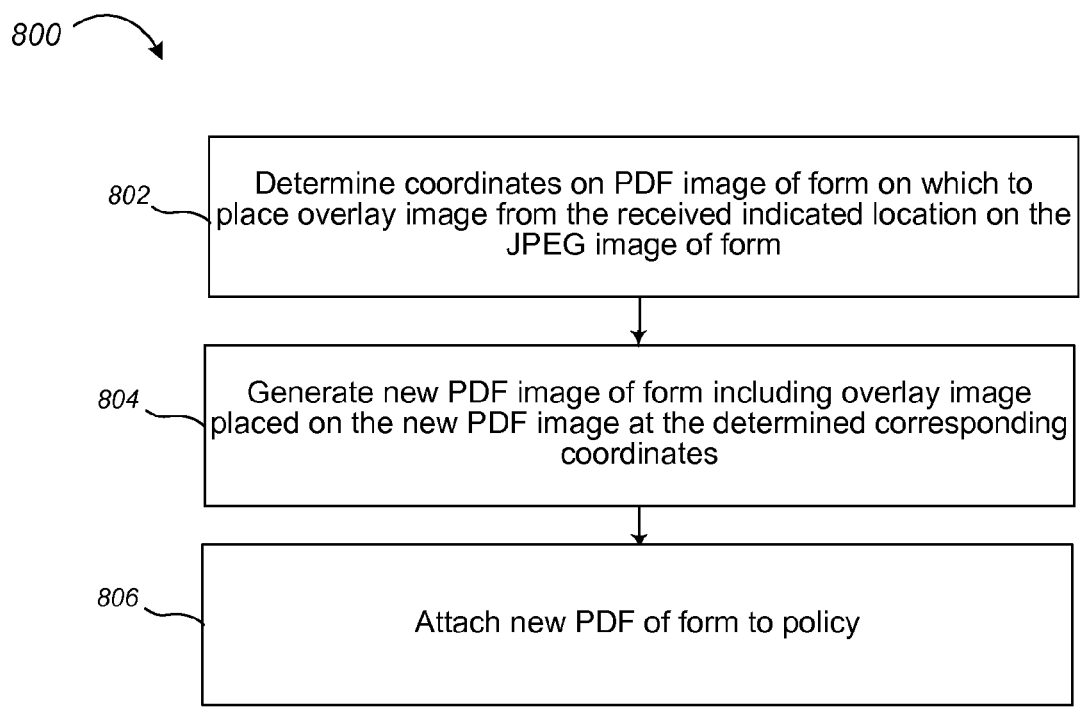
FIG. 8 is a flow diagram illustrating an automated process for generating PDF images of forms on which an image had been placed on a JPEG version of the form, according to one illustrated embodiment.

FIG. 8 is a flow diagram illustrating an automated process for generating PDF images of forms on which an image had been placed on the JPEG version of the form using the process of FIG. 7, according to one illustrated embodiment.

At 802, the coordinates on the PDF form or form template on which to place an overlay image are determined from the received indicated location at which the overlay image was placed on the JPEG image of the form. For example, once the general agent had, using a mouse, selected, dragged and dropped the overlay image on the JPEG image, the Web browser or image application accessed by the Web browser captures the specific coordinates of the JPEG image underneath the overlay image and on which the overlay image is located. These are then translated into the corresponding coordinates of the original PDF form version of the underlying JPEG image. This translation may be performed by the policy issuance server or the general agent system. If performed by the general agent system, the corresponding coordinates of the original PDF form version of the underlying JPEG image may then be communicated to the policy issuance server.

At 804, a new PDF form or form template corresponding to the underlying JPEG image is generated including the overlay image placed on the new PDF form or form template at the determined corresponding coordinates. For example, the policy issuance server may use the corresponding coordinates of the original PDF version of the underlying JPEG image to use a PDF form generation or editing tool to automatically generate the new PDF including the overlay image placed on the new PDF form or for template at the determined corresponding coordinates. Alternatively, this form generation may be performed by the general agent system and then the general agent system may send the generated form to the policy issuance server.

At 806, the policy issuance server then attaches the new PDF form to the policy. In other embodiments, the electronic forms or form templates generated from the underlying image and overlay image may be in various other formats instead of PDF. Also, in other embodiments, instead of JPEG, the particular format of the underlying image may be other formats which are also formats in which images in such formats may have other images visually placed over them within a graphical user interface of a Web browser in such a manner that the position of the other image relative to the image on which it is placed is stored using the functionality of the Web browser or application being accessed by the Web browser. Also, if a client other than a Web browser is being used to access the forms, the particular format of the underlying image, for example, is one in which images in such a format may have other images visually placed over them within the particular type of client being used in such a manner that the position of the other image relative to the image on which it is placed is stored using functionality of the particular client or application being accessed by the client.

Figure 9:
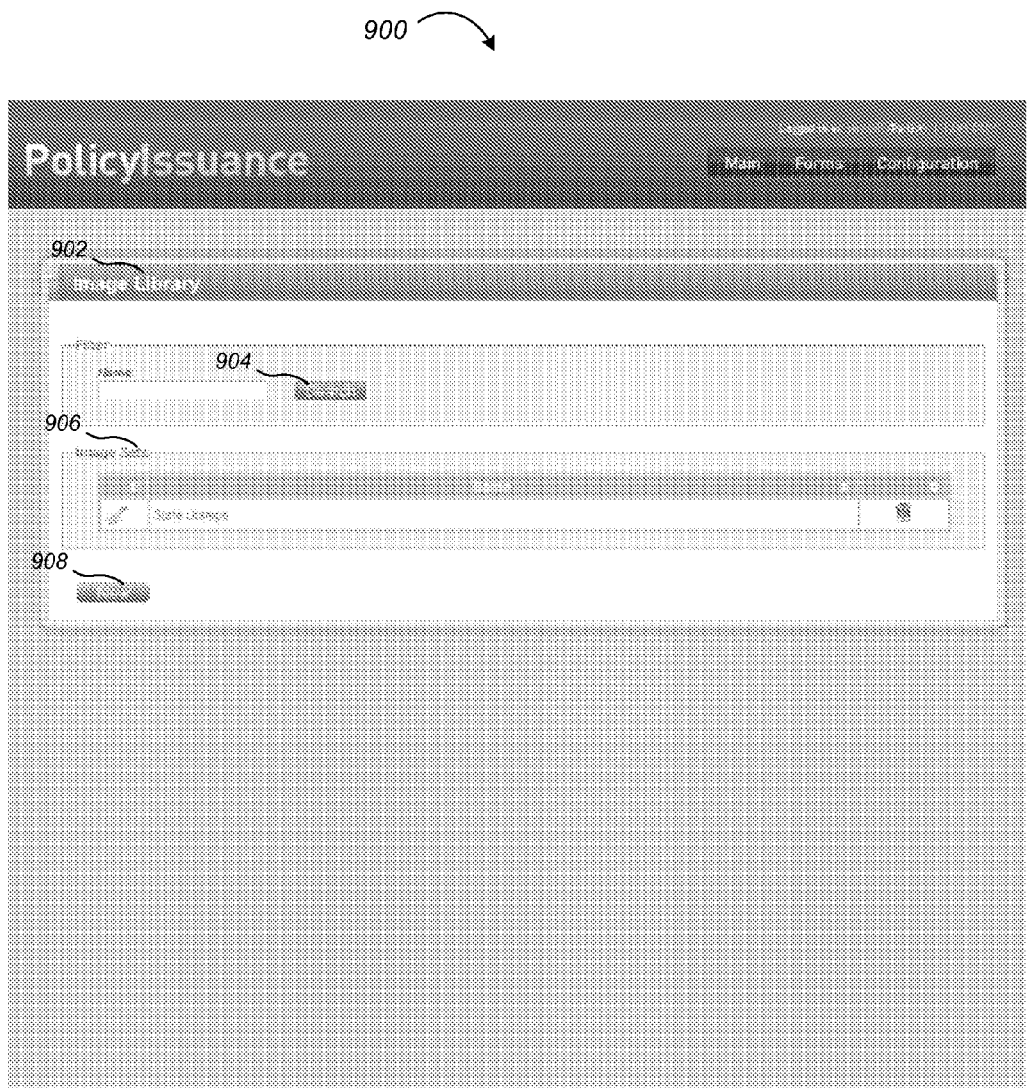
FIG. 9 is a screenshot of an example graphical user interface within a Web browser wherein a user may search existing or create new image sets which can be placed on forms, according to one illustrated embodiment.

FIG. 9 is a screenshot 900 of an example graphical user interface (GUI) within a Web browser wherein a user may search existing or create new image sets which can be placed on forms, according to one illustrated embodiment. For example, the screenshot 900 may be of an example graphical user interface (GUI) within a Web browser of the general agent system that is accessing the policy issuance server. The policy issuance server may serve a Web page shown in the screen shot 900 that is providing the GUI displayed within the Web browser of the general agent system. The GUI shows an image library 902 including various image sets 906. The image sets 906 may include various images which may be overlaid (i.e., overlay images) on forms or form templates available from the policy issuance server. For example, image sets 906 may include state specific insurance policy form stamps organized in various manners such as by state. Also, shown is GUI control 904 on which the user may select (e.g., click or otherwise) to search the image sets 906 by keyword or name and a GUI control 908 on which the user may select (e.g., click or otherwise) to create a new image set to add to the image library 902.

Figure 10:
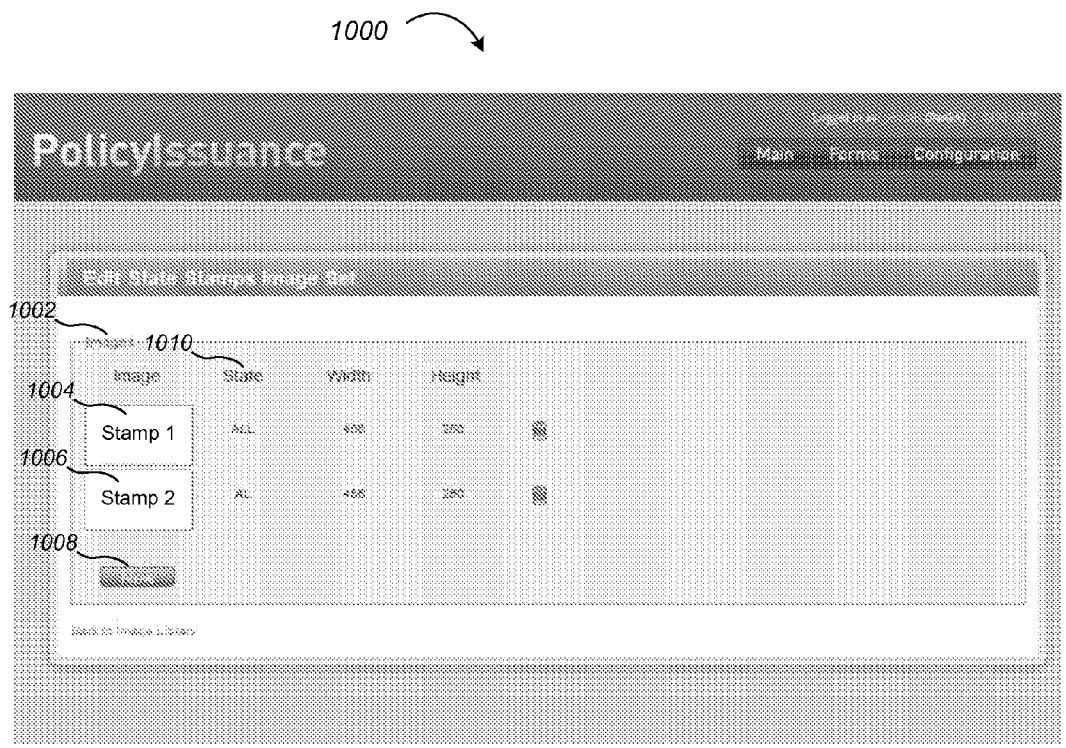
FIG. 10 is a screenshot of an example graphical user interface within a Web browser wherein a user may edit a new or an existing image set by adding different images for specific states, according to one illustrated embodiment.

FIG. 10 is a screenshot 1000 of a GUI within a Web browser wherein a user may edit a new or an existing image set by adding different images for specific states, according to one illustrated embodiment. The GUI shows an image set 1002 with two images, each represented by a thumbnail image 1004, 1006. A user of the GUI may add additional images by selecting the new button 1008 and uploading them accordingly. The images may be assigned by the user to different states and shown categorized according to the different assigned states as shown by the state column 1010 on the GUI of screenshot 1000.

Figure 11:
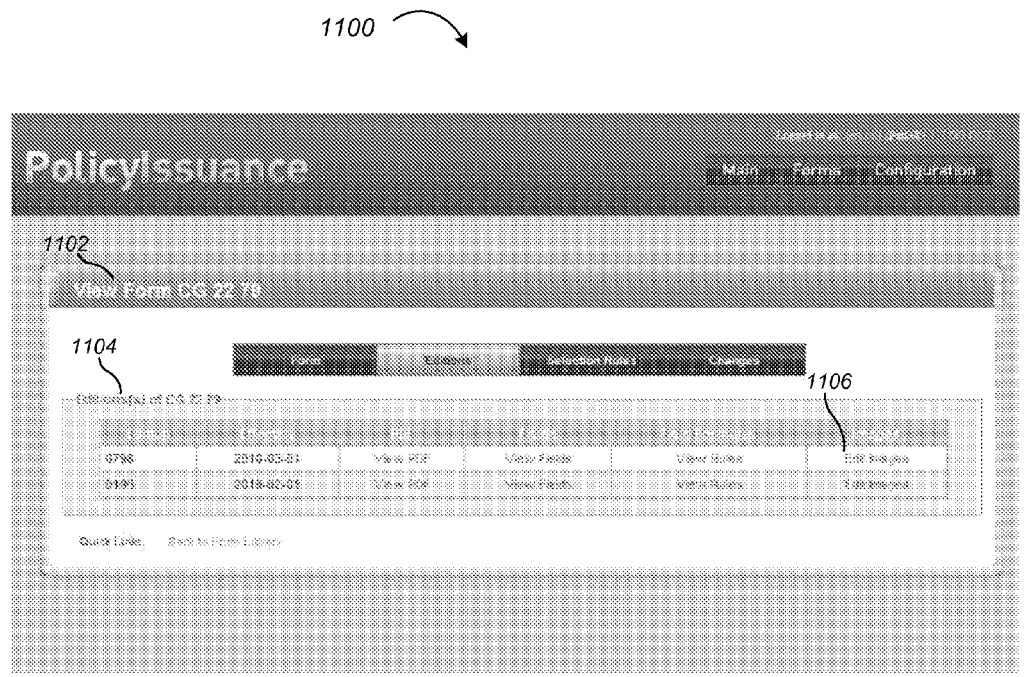
FIG. 11 is a screenshot of an example graphical user interface within a Web browser wherein a user may add an image to or modify existing images on a form, according to one illustrated embodiment.

FIG. 11 is a screenshot 1100 of an example GUI within a Web browser wherein a user may add an image to or modify existing images on a particular form, according to one illustrated embodiment. The GUI includes a view form section 1102 which displays various editions 1104 of the form. Using the mouse, the user may select an edit images interface control 1106 associated with the form for which the user is going to add an overlay image to or modify an existing overlay image.

Figure 12:
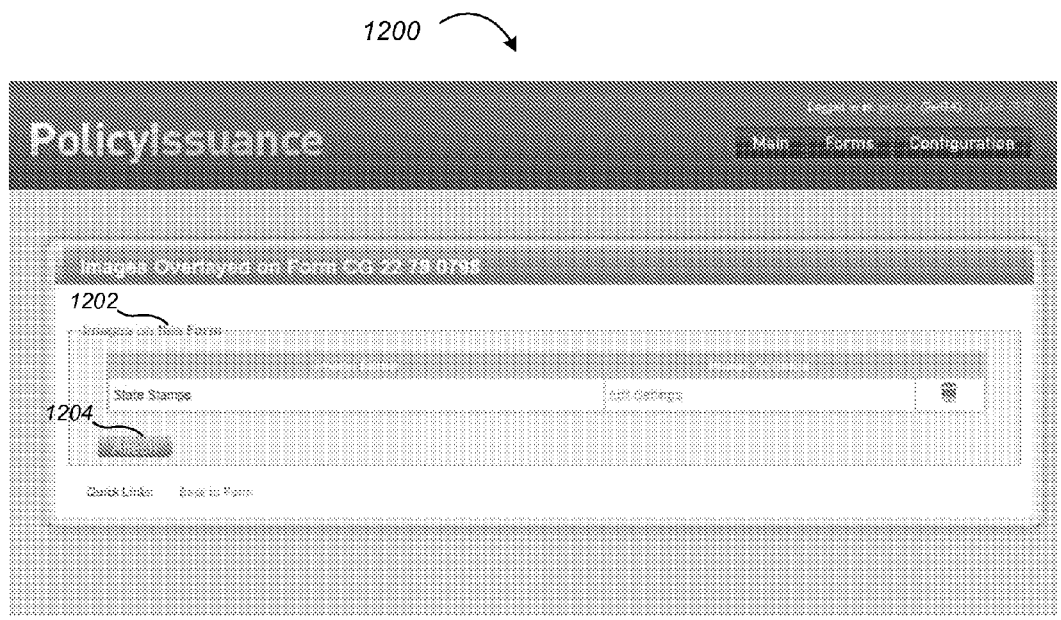
FIG. 12 is a screenshot of an example graphical user interface within a Web browser showing a list of the images overlaid on a particular form.

FIG. 12 is a screenshot 1200 of an example GUI within a Web browser showing a list of the images overlaid on a particular form. For example, the GUI of screenshot 1200 may be invoked when the user selects the edit images interface control 1106 for the particular form shown in FIG. 11. Image list section 1202 of the GUI shows the list of overlay images (e.g., state specific stamps) or image sets on or otherwise associated with the particular form (e.g., form CG 22 version 0798). Also shown is an attach button 1204 which the user may select to attach or overlay particular images of the image sets on the underlying form. Other GUI controls may be used in addition to or instead of those shown to indicate or invoke the corresponding actions described herein.

Figure 13:
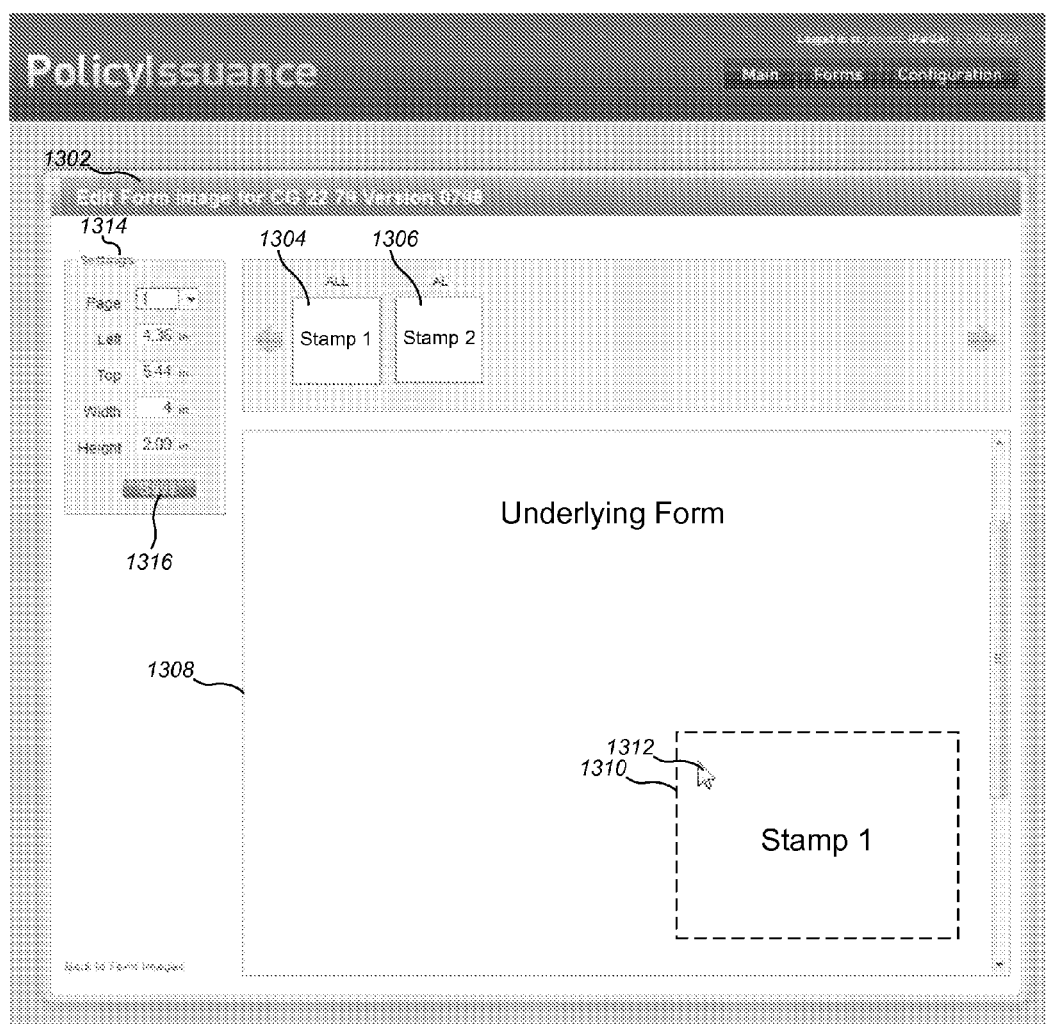
FIG. 13 is a screenshot of an example graphical user interface within a Web browser wherein a user may drag a selected image on the form and apply settings, according to one illustrated embodiment.

FIG. 13 is a screenshot 1300 of an example graphical user interface within a Web browser wherein a user may drag a selected image on the form and apply settings, according to one illustrated embodiment. For example, the GUI shown in screenshot 1300 may be invoked when the user selects the attach button or icon shown in FIG. 12. Shown on the GUI of screenshot 1300 is an edit area or field 1302 displaying the underlying form 1308 and is designated by a title indicating which underlying form is currently being edited (e.g., form CG 22 version 0798). Also shown are a settings panel 1314, a save button or icon 1316 and thumbnail images 1304, 1306 of corresponding overlay images indicating that the corresponding overlay images are available to be placed on the underlying form 1308. The underlying form 1308 is displayed in JPEG format such that the user may select the applicable thumbnail image indicating the desired overlay image (e.g., state specific stamp), which will then cause the corresponding overlay image 1310 to appear at a default location on the underlying form 1308.

The underlying form 1308 being displayed in JPEG format within the Web browser also allows the user to drag, with the mouse cursor 1312, the overlay image 1310 to the desired location on the underlying form 1308 within the Web browser. Using the mouse cursor, the user may also resize the overlay image 1310 by selecting (e.g., clicking) and dragging on a corner or side of the overlay image 1310. Alternatively, the user may select (e.g., click) and drag the thumbnail image 1304 itself onto the underlying form 1308 to indicate the desired location of the corresponding overlay image 1310. Although the underlying form 1308 displayed is actually a JPEG version of the original PDF form, it appears to the user that they are placing the overlay image directly on the original PDF version of the underlying form 1308.

Figure 14:
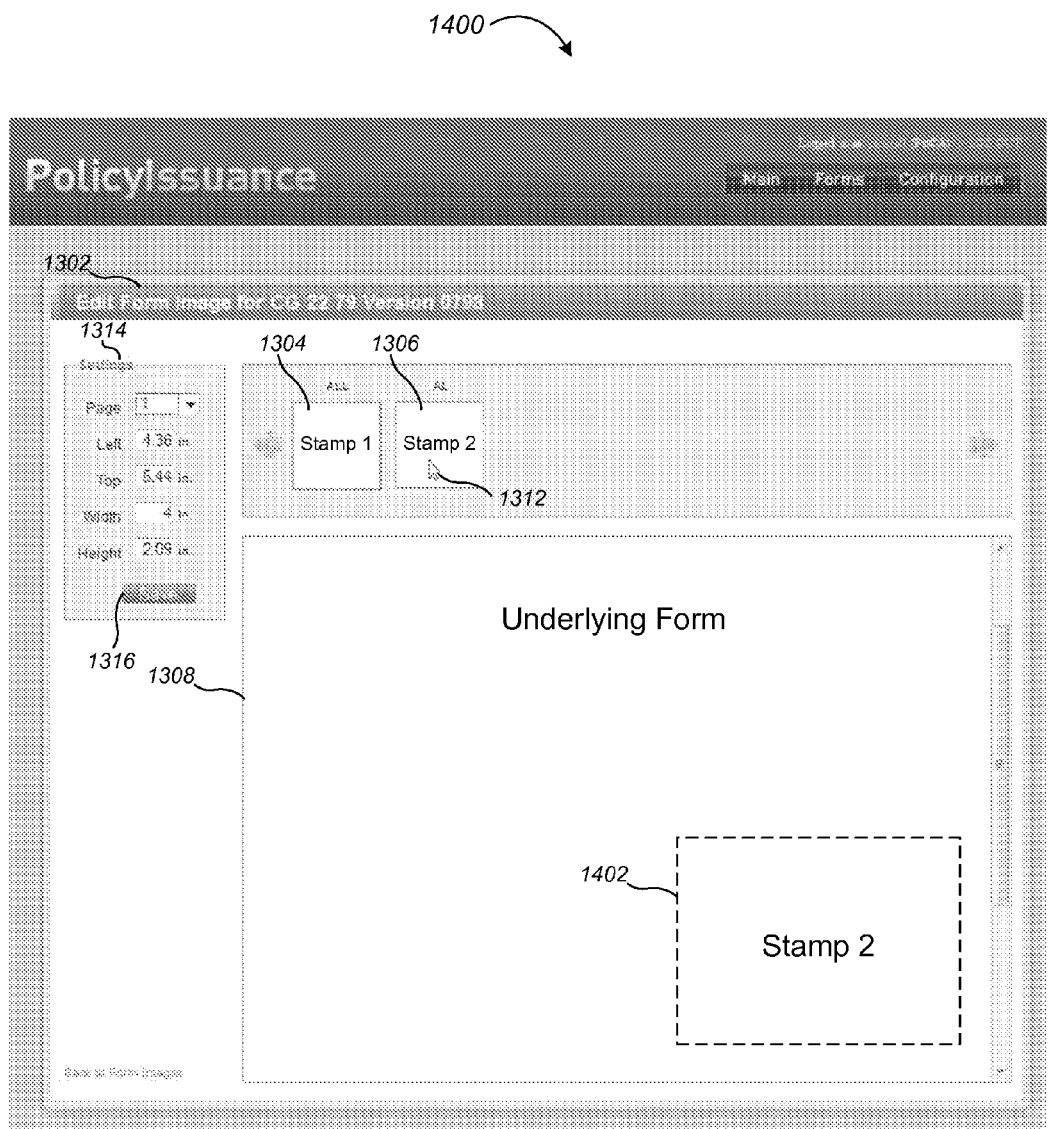
FIG. 14 is a screenshot of the example graphical user interface of FIG. 13, wherein a user has selected a different image from the image set, according to one illustrated embodiment.

FIG. 14 is a screenshot 1400 of the example graphical user interface of FIG. 13, wherein the user has selected a different image from the image set, according to one illustrated embodiment. Note that the user used the mouse to select the thumbnail 1306 to indicate selection of the corresponding overlay form 1402. This is indicated by the mouse cursor 1312 on the thumbnail image 1306. Once the user selects the different overlay image 1402 from the image set by clicking on the corresponding thumbnail image 1306, the overlay image 1402 replaces the previous overlay image 1310 shown selected in FIG. 13 initially at the same location on the underlying form 1308 as the previous overlay image 1310. Also, the overlay image 1402 initially has the same selected size as the previously selected overlay image 1310.

The settings panel 1316 on the left of the screenshot 1314 displays the current dimensions of the overlay image 1402 and the current location of the overlay image 1402 on the underlying form 1308. A user may also directly enter in the fields of the settings panel 1314 the particular desired dimensions of the overlay image 1402 and the desired location on the underlying form 1308 on which to place the overlay image 1402. Also shown is a save button or icon 1316 on the settings panel 1314 which the user may select to save the current settings. Once the user selects the save button or icon 1316, the current settings are saved and the corresponding coordinates are ultimately used by the policy issuance server to generate the final PDF version of the underlying form including the overlay form integrated on the PDF version of the form according to the saved settings.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as floppy disks, hard disk drives, CD ROMs, digital tape, and computer memory including registers.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification are incorporated herein by reference, in their entirety, including U.S. Provisional Patent Application No. 61/422,090, filed Dec. 10, 2010. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method in an image overlay system, comprising:
   receiving, by the image overlay system, a first form in a first format, wherein the first form is an electronic form that is electronically fillable, wherein the image overlay system includes at least one computer processor and at least one memory coupled to the at least one computer processor;
   electronically converting, by the image overlay system, the first form to a second format to generate a second form in the second format, wherein the second form is an electronic form that is not electronically fillable;
   in response to receiving a client request, electronically communicating, by the image overlay system, the second form to be displayed within a user interface of a client associated with the client request instead of electronically communicating the first form in the first format to be displayed within the user interface, wherein the second form as displayed within the user interface is substantially visually indistinguishable from the first form were the first form to be displayed within the user interface, and wherein the second format is a format such that an image file in the second format is able to have other images visually placed over an image stored in the image file in the second format within the user interface in a manner that data indicating a position of the other images relative to the image stored in the image file in the second format on which the other images are placed is able to be captured and stored using functionality of the client or a service accessed by the client;
   receiving, by the image overlay system, data indicating a position of an overlay image overlaid on the second form, wherein the overlay image is stored in an electronic file with the overlay image ultimately to be overlaid on an image stored by an electronically fillable form; and
   generating, by the image overlay system, a third form in the first format, wherein the third form is an electronic form that is electronically fillable, the generating including incorporating the overlay image on an image stored by the third form at a location on the image stored by the third form corresponding to the data indicating the position of the overlay image on the second form.

2. The method of claim 1 wherein the first format is a format such that an image file in the first format is not able to have other images visually placed over an image stored in the image file in the first format within the user interface in such said manner relative to the image stored in the image file in the first format.

3. The method of claim 1 wherein the first format is portable document format and the second format is Joint Picture Expert Group format.

4. The method of claim 1 further comprising at least partially electronically filling the first form before electronically converting the first form.

5. The method of claim 1 wherein the first, second and third forms are insurance policy forms.

6. The method of claim 1 further comprising:
   receiving insurance policy form data; and
   automatically determining a list of insurance policy forms based on the insurance policy form data, wherein the first form is one of the insurance policy forms on the determined list.

7. The method of claim 1 wherein the first form, the second form and the third form are insurance policy forms and further comprising:
   electronically attaching the third form to an insurance policy; and
   electronically communicating an access mechanism to the insurance policy to a user for insurance policy verification by the user.

8. The method of claim 1 wherein the first form, the second form and the third form are insurance policy forms and the overlay image is an image of a state specific stamp for placement on insurance policy forms.

9. The method of claim 1 further comprising:
   receiving a plurality of files storing overlay images; and
   in response to receiving the client request, electronically communicating the plurality of files storing overlay images, the overlay images to be displayed within the user interface.

10. A system, comprising:
    a computer processor; and
    a non-transitory memory communicatively coupled to the computer processor having computer-executable instructions stored thereon that when executed by the computer processor cause the computer processor to:
    receive a first form in a first format, wherein the first form is an electronic form that is electronically fillable;
    electronically convert the first form to a second format to generate a second form in the second format, wherein the second form is an electronic form that is not electronically fillable;
    in response to receiving a client request, electronically communicate the second form to be displayed within a user interface of a client associated with the client request instead of electronically communicating the first form in the first format to be displayed within the user interface;
    receive data indicating a position of an overlay image overlaid on the second form, wherein the overlay image is stored in an electronic file with the overlay image ultimately to be overlaid on an image stored by an electronically fillable form; and
    generate a third form in the first format, wherein the third form is an electronic form that is electronically fillable, by incorporating the overlay image on an image stored by the third form at a location on the image stored by the third form corresponding to the data indicating the position of the overlay image on the second form.

11. The system of claim 10, wherein the second form as displayed within the user interface is substantially visually indistinguishable from the first form were the first form to be displayed within the user interface.

12. The system of claim 10, wherein the second format is a format such that an image file in the second format is able to have other images visually placed over an image stored in the image file in the second format within the user interface in such a manner that data indicating a position of the other images relative to the image stored in the image file in the second format on which the other images are placed is able to be captured and stored using functionality of the client or a service being accessed by the client.

13. The system of claim 10 wherein the first, second and third forms are insurance policy forms.

14. The system of claim 13, wherein the computer-executable instructions, when executed by the computer processor, further cause the computer processor to:
receive insurance policy form data; and
automatically determine a list of insurance policy forms based on the insurance policy form data, wherein the first form is one of the insurance policy forms on the determined list.

15. The system of claim 13, wherein the computer-executable instructions, when executed by the computer processor, further cause the computer processor to:
electronically attach the third form to an insurance policy; and
electronically communicate an access mechanism to the insurance policy to a user for insurance policy verification by the user.

16. The system of claim 10 wherein the first format is portable document format.

17. The system of claim 10 wherein the second format is Joint Picture Expert Group format.

18. A non-transitory computer readable storage medium, having computer computer-executable instructions stored thereon that when executed by a computer processor cause the computer processor to perform:
receiving a selection of a first form from a plurality of forms in a first format, wherein the plurality of forms are electronic forms and are electronically fillable in the first format;
displaying within a user interface of a client a second form in a second format, wherein the second form is the first form converted to an electronic form that is not electronically fillable in the second format;
displaying at least one overlay image on the user interface, wherein the overlay image is stored in an electronic file with the overlay image ultimately to be overlaid on an image stored by an electronically fillable form, the at least one overlay image available to be visually placed over the second form within the user interface on which the second form is displayed;
receiving an indication of a location corresponding to a location on the second form on which the overlay image was visually placed within the user interface; and
electronically communicating the indication of the location to enable generation a third form in the first format incorporating the overlay image on an image stored by the third form at a location on the image stored by the third form corresponding to the indication of the location.

19. The non-transitory computer readable storage medium of claim 18 wherein the second form as displayed in the user interface is substantially visually indistinguishable from the first form, were the first form to be displayed within the client.

20. The non-transitory computer readable storage medium of claim 18 wherein the first format is portable document format and the second format is Joint Picture Expert Group format.

21. A computer-implemented method in an image overlay system, comprising:
receiving, by the image overlay system, a first electronic form of a first file type that is electronically fillable, the first electronic form including data and fields and having a first format, the fields of the first electronic form being electronically fillable, wherein the image overlay system includes at least one computer processor and at least one memory coupled to the at least one computer processor;
generating, by the image overlay system, a second electronic form of a second file type that is not electronically fillable, the second electronic form replicating the data, the fields and the format of the first electronic form, the fields of the second electronic form being not electronically fillable, the second file type being a file type such that when the second electronic form is displayed by an element of a user interface, an image represented by an image file is selectively visually representable by the element of the user interface overlying at least a portion of the second electronic form at a number of end user selectable positions;
in response to receiving a client request, electronically communicating, by the image overlay system, the second electronic form to be displayed by at least one element of a client user interface of a client associated with the client request instead of communicating the first electronic form;
receiving, by the image overlay system, client data indicative of a user selected image and a user identified position for the selected image with respect to at least one element of the second electronic form; and
generating, by the image overlay system, a third electronic form of the first file type that is electronically fillable, the third electronic form replicating the data, the fields and the format of the first electronic form and including the user selected image at the user identified position, the fields of the first electronic form being electronically fillable.

22. The method of claim 1, further comprising:
receiving, by the image overlay system, data indicating a size of the overlay image overlaid on the second form,
wherein the overlay image incorporated on the image stored by the third form has a dimension corresponding to the data indicating the size of the overlay image overlaid on the second form.

* * * * *